US012494578B2

(12) United States Patent
Wada et al.

(10) Patent No.: US 12,494,578 B2
(45) Date of Patent: Dec. 9, 2025

(54) ANTENNA DEVICE AND RADAR DEVICE

(71) Applicant: KABUSHIKI KAISHA TOSHIBA, Tokyo (JP)

(72) Inventors: Kentaro Wada, Yokohama Kanagawa (JP); Koh Hashimoto, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 214 days.

(21) Appl. No.: 18/176,402

(22) Filed: Feb. 28, 2023

(65) Prior Publication Data

US 2024/0072441 A1 Feb. 29, 2024

(30) Foreign Application Priority Data

Aug. 31, 2022 (JP) ................................ 2022-138652

(51) Int. Cl.
*H01Q 5/371* (2015.01)
*H01Q 5/45* (2015.01)

(52) U.S. Cl.
CPC ............... *H01Q 5/371* (2015.01); *H01Q 5/45* (2015.01)

(58) Field of Classification Search
CPC ....... H01Q 1/38; H01Q 5/30–45; H01Q 19/30
See application file for complete search history.

(56) References Cited

U.S. PATENT DOCUMENTS 5,008,681 A * 4/1991 Cavallaro ............ H01Q 19/005 343/819
5,021,799 A * 6/1991 Kobus .................... H01Q 9/285 343/795
7,724,200 B2 5/2010 Kitamori et al.
9,172,142 B2 10/2015 Sudo et al.
10,170,838 B2 * 1/2019 Garcia .................... H01L 23/66
(Continued)

FOREIGN PATENT DOCUMENTS

JP H1-245601 A 9/1989
JP 2000-278037 A 10/2000
(Continued)

OTHER PUBLICATIONS

Hiroshi Nakano et al., "Post-Wall Waveguide Aperture Antenna for Millimeter-Wave File-Transfer Systems," IEICE Trans., vol. J93-C, No. 12, pp. 597-603, and translation, 9 pages (2010).
(Continued)

*Primary Examiner* — Hasan Islam
(74) *Attorney, Agent, or Firm* — Finnegan, Henderson, Farabow, Garrett & Dunner, LLP

(57) ABSTRACT

According to one embodiment, an antenna device includes a substrate; a feed element provided on or inside the substrate; a feeder line provided on or inside the substrate and configured to feed power to the feed element; and at least one of a director provided on or inside the substrate and away from the feed element, and a reflector provided on or inside the substrate and away from the feed element, wherein the substrate includes a first portion having a first thickness and a second portion having a second thickness greater than the first thickness, at least one of at least a part of the feed element and at least a part of the director is provided on or inside the first portion, and at least a part of the feeder line is provided on or inside the second portion.

19 Claims, 25 Drawing Sheets

(56) References Cited

U.S. PATENT DOCUMENTS

| | | | |
|---|---|---|---|
| 11,095,040 B2 | 8/2021 | Sonoda | |
| 11,476,591 B2 * | 10/2022 | Brar | H01Q 21/062 |

FOREIGN PATENT DOCUMENTS

| | | | |
|---|---|---|---|
| JP | 4379541 B2 | 12/2009 |
| JP | 5429215 B2 | 2/2014 |
| JP | 2019-216362 A | 12/2019 |
| JP | 6927293 B2 | 8/2021 |
| JP | 2022-102706 A | 7/2022 |
| WO | WO 2007/097282 A1 | 8/2007 |

OTHER PUBLICATIONS

Fran Zhang et al., "A Loaded Wideband Linearly Tapered Slot Antenna With Broad Beamwidth," IEEE Antennas and Wireless Propagation Letters, vol. 10, pp. 79-82, DOI:10.1109/LAWP.2011.2106477 (2011).

James Sor et al., "A Broadband Quasi-Yagi Antenna Array," 29th European Microwave Conference, vol. 3, pp. 255-258 (1999).

Ryosuke Suga et al., "Cost-Effective 60-GHz Antenna Package With End-Fire Radiation for Wireless File-Transfer System," IEEE Trans. on Microwave Theory and Techniques, vol. 58, No. 12, pp. 3989-3995 (2010).

Japan Patent Office, Office Action in JP App. No. 2022-138652 (May 9, 2025).

Japan Patent Office, Decision to Grant a Patent in JP App. No. 2022-138652 (Aug. 15, 2025).

* cited by examiner

- Frequency: 79 GHz
- Main lobe magnitude of the antenna device 100: 7.5 dBi
- Main lobe magnitude of the antenna device 130: 7.7 dBi
- Main lobe direction of the antenna device 100: 6 deg.
- Main lobe direction of the antenna device 130: 4 deg.

- Frequency: 79 GHz
- Main lobe magnitude of the antenna device 100: 7.5 dBi
- Main lobe magnitude of the antenna device 160: 7.8 dBi
- Main lobe direction of the antenna device 100: 6 deg.
- Main lobe direction of the antenna device 160: 0 deg.

ANTENNA DEVICE AND RADAR DEVICE

CROSS REFERENCE TO RELATED APPLICATIONS

This application is based upon and claims the benefit of priority from the prior Japanese Patent Application No. 2022-138652, filed on Aug. 31, 2022, the entire contents of which are incorporated herein by reference.

FIELD

Embodiments relate to antenna device and radar device.

BACKGROUND

For an antenna with directivity in a direction parallel to the substrate, a technique of using strip conductors as a feed element and directors of a planar Yagi-Uda antenna is known. Another example is post-wall waveguides or substrate integrated waveguides (SIWs), which are techniques of forming an antenna with a directivity in a direction parallel to the substrate, using a waveguide structure in which two rows of conductor vias are continuously arranged on parallel plates or dielectric substrate with metal top and bottom surfaces, and using a director formed from a strip conductor and conductor via.

However, the aforementioned techniques all have a problem in that the antenna device cannot be designed to have the desired directivity due to the influence of the substrate unless the substrate thickness is sufficiently small relative to the operating wavelength of the antenna device (i.e., the wavelength of the radio wave to be transmitted or received by the antenna device).

An antenna device typically includes an antenna, a power supply component that supplies power, a radio frequency integrated circuit (RFIC), and a controller component for the antenna device. These components can be placed on a substrate by surface mount technology (SMT) and connected together via a conductive pattern formed on the substrate. Furthermore, if the substrate is multilayered and conductive patterns are formed on a plurality of layers, complex wiring can be accommodated in a single substrate.

On the other hand, to multilayer a substrate, it is necessary to increase the layer thickness of the substrate according to the number of layers. Although flame retardant type 4 (FR-4) substrates are widely used for power lines and wiring between components, these substrates are not suitable for use in high-frequency bands such as the millimeter wave band due to their high transmission loss. High-frequency substrates made of low-dielectric-loss materials are suitable as substrates for transmitting signals in high-frequency bands.

In antenna devices for high-frequency bands such as the millimeter wave band, laminated substrates are often used, in which feeding lines and feed elements are formed on or inside of high-frequency substrates, wiring for various components such as controller components of antenna devices is formed on or inside of generic substrates such as FR-4 substrates, which are less expensive than high-frequency substrates, and these substrates are bonded together with prepregs or other materials. In this configuration, the substrate thickness becomes thicker, and in high-frequency bands such as the millimeter wave band, the substrate thickness may be non-negligible in relation to the operating wavelength of the antenna device. In such cases antenna devices that use the direction parallel to the substrate's surface or inclined from the substrate's surface as the target direction of radiation have a problem in that the directivity of the antenna device does not match the desired target direction of radiation due to the influence of the substrate thickness.

DETAILED DESCRIPTION

According to one embodiment, an antenna device includes a substrate; a feed element provided on or inside the substrate; a feeder line provided on or inside the substrate and configured to feed power to the feed element; and at least one of a director provided on or inside the substrate and away from the feed element, and a reflector provided on or inside the substrate and away from the feed element, wherein the substrate includes a first portion having a first thickness and a second portion having a second thickness greater than the first thickness, at least one of at least a part of the feed element and at least a part of the director is provided on or inside the first portion, and at least a part of the feeder line is provided on or inside the second portion.

This embodiment will now be described in detail with reference to the accompanying drawings. In the following description, the X-, Y-, and Z-axes represent mutually orthogonal axes, and the +X-, +Y-, and +Z-axis directions represent positive directions parallel to the X-, Y-, and Z-axes, respectively. The −X-, −Y-, and −Z-axis directions represent negative directions parallel to the X-, Y-, and Z-axes, respectively. When simply referred to as the X-, Y-, and Z-axes, each includes both + and − directions along the X-, Y-, and Z-axes, respectively.

First Embodiment

The antenna device according to the first embodiment will now be described with reference to FIGS. 1, 2, and 3.

Figure 1:
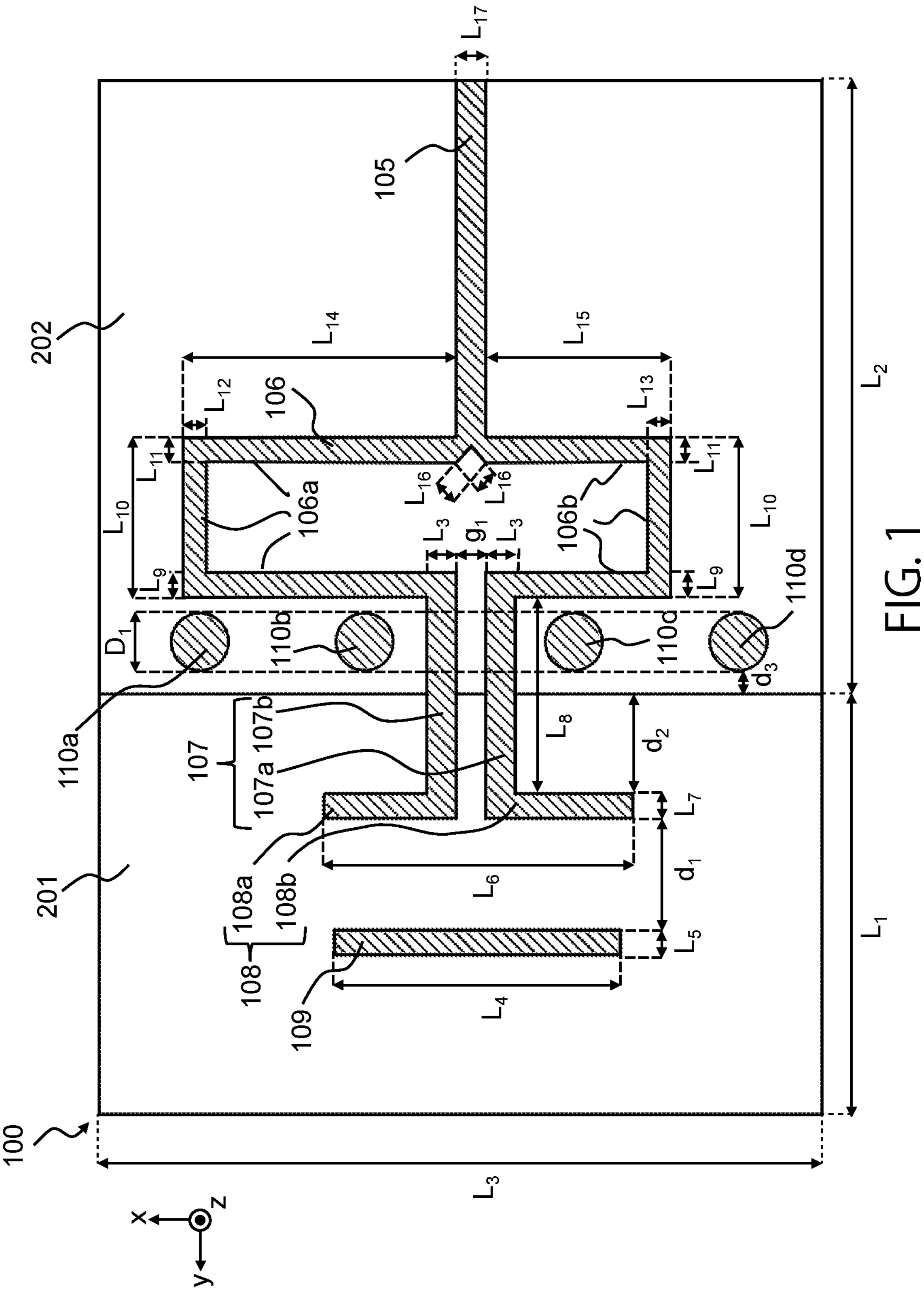
FIG. 1 is a plan view of an antenna device according to a first embodiment.

FIG. 1 is a plan view schematically showing an antenna device 100 according to the first embodiment.

Figure 2:
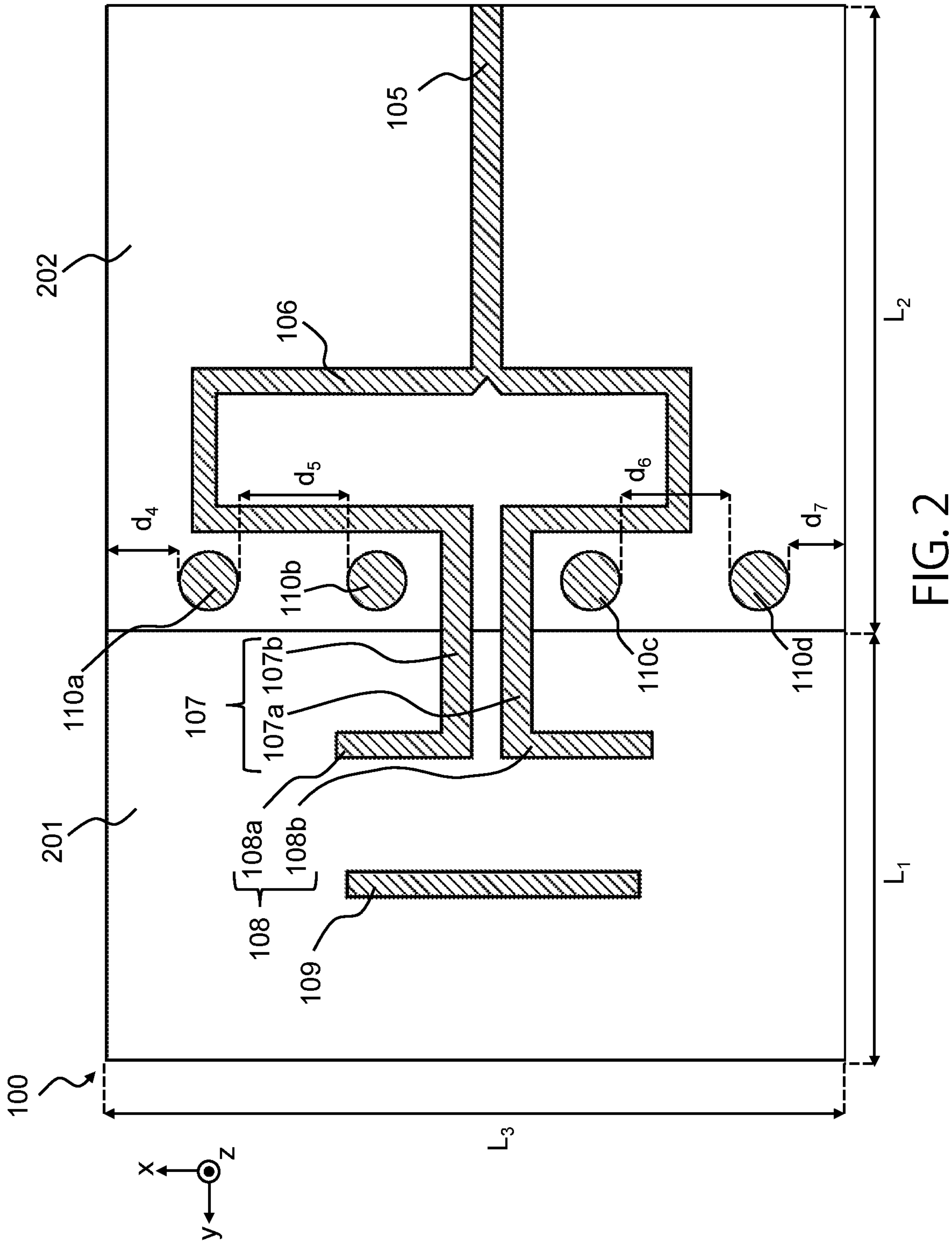
FIG. 2 is a supplementary diagram for FIG. 1.

FIG. 2 is a supplementary diagram for FIG. 1 to show dimensions not shown in FIG. 1.

Figure 3:
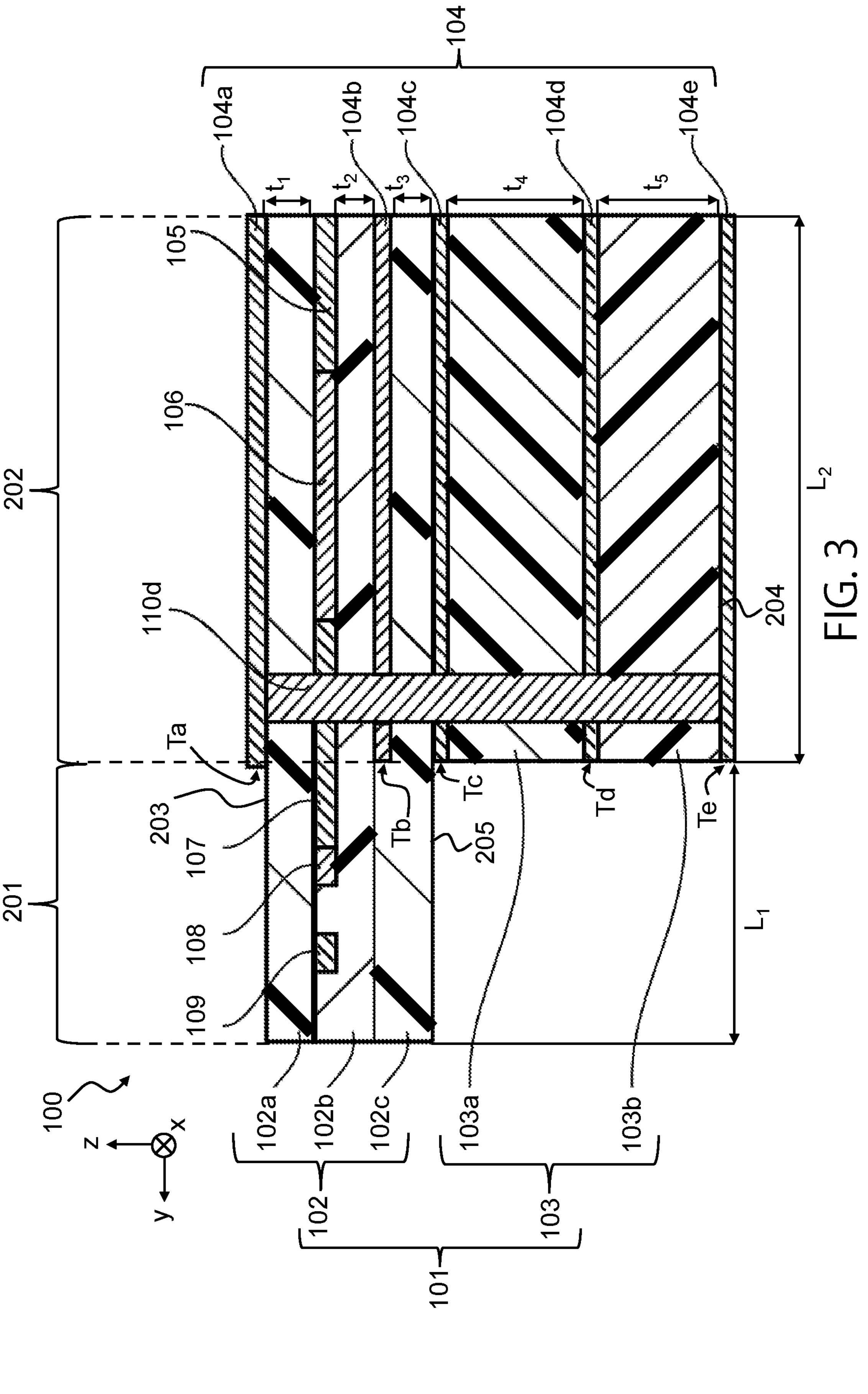
FIG. 3 is a cross-sectional view of the antenna device shown in FIG. 1.

FIG. 3 is a cross-sectional view schematically showing the antenna device 100 shown in FIG. 1. Cross sections of different positions along the x-axis direction in FIG. 1 are shown for each section along the y-axis direction shown in FIG. 3. For example, the first feeder line 105 and via 110*d* in FIG. 3 are located in different positions along the X-axis direction in FIG. 1. In this way, the cross-sectional structure of each component in FIG. 1 can be shown together in the same drawing. The grounding conductor 104 in FIG. 3 is omitted in FIG. 1.

The antenna device 100 according to the first embodiment shown in FIGS. 1 to 3 is compatible with, for example, the fifth generation mobile communication system (so-called 5G), wireless communication standards such as Bluetooth (registered trademark), and wireless LAN (local area network) such as IEEE802.11ax. In addition, the antenna device 100 supports not only wireless communications, but also radars operated in 24 GHz band, 60 GHz band, 76 GHz band, and 79 GHz band, and other frequency bands. The antenna device 100 is configured to be capable of transmitting and receiving radio waves in the super high frequency (SHF) band of 3 GHz to 30 GHz, and radio waves in the extremely high frequency (EHF) band of 30 GHz to 300 GHz.

The antenna device 100 includes a substrate 101, a grounding conductor 104, a first feeder line 105, a balun 106, a second feeder line 107, a feed element 108, a director 109, a via 110*a*, a via 110*b*, a via 110*c*, and a via 110*d*.

The substrate 101 includes a high-frequency substrate 102 (first substrate) and a generic substrate 103 (second substrate). The high-frequency substrate 102 includes a high-frequency substrate 102*a*, a high-frequency substrate 102*b*, and a high-frequency substrate 102*c*. The high-frequency substrates 102*a* to 102*c* are also referred to as substrates 102*a* to 102*c*.

The generic substrate 103 includes a generic substrate 103*a* and a generic substrate 103*b*. The generic substrates 103*a* and 103*b* are also referred to as substrates 103*a* and 103*b*.

The substrate 101 includes a substrate's surface 203, a substrate's surface 204, and a substrate's surface 205.

The high-frequency substrate 102 (first substrate) and the generic substrate 103 (second substrate) are stacked in the first direction (Z-axis direction) perpendicular to the substrate's surface 203 of the substrate 101, thereby forming the substrate 101.

The substrate 101 includes a first portion 201 having a first thickness and a second portion 202 having a second thickness with respect to the second direction (Y-axis direction) parallel to the substrate's surface 203. The first thickness is approximately equal to the thickness of the high-frequency substrate 102. The second thickness is approximately equal to the combined thickness of the high-frequency substrate 102 and the generic substrate 103. Thus, the first thickness is thinner than the second thickness. The generic substrate 103 has a shorter length than the high-frequency substrate 102 with respect to the Y-axis direction.

The grounding conductor 104 includes a first grounding conductor 104*a*, a second grounding conductor 104*b*, a third grounding conductor 104*c*, a fourth grounding conductor 104*d*, and a fifth grounding conductor 104*e*, each of which has a planar shape. The first grounding conductor 104*a*, the second grounding conductor 104*b*, the third grounding conductor 104*c*, the fourth grounding conductor 104*d* and the fifth grounding conductor 104*e* are also referred to as the grounding conductor 104*a*, the grounding conductor 104*b*, the grounding conductor 104*c*, the grounding conductor 104*d*, and grounding conductor 104*e*, respectively.

The first feeder line 105, the balun 106, the second feeder line 107, the feed element 108 (radiator element), and the director 109 are formed as a metal pattern between the substrate 102*a* and substrate 102*b* in the high-frequency substrate 102. To be specific, this metal pattern is provided on or inside the substrate 102*b*: more specifically, with its surface exposed, the metal pattern is embedded in a part of the surface area of the substrate 102*b*. The first grounding conductor 104*a* is formed on the substrate's surface 203. The second grounding conductor 104*b* is formed inside the high-frequency substrate 102. To be specific, with its surface exposed, the second grounding conductor 104*b* is embedded in a part of the surface area of the high-frequency substrate 102*c*. The third grounding conductor 104*c* is formed at the boundary between the high-frequency substrate 102 and the generic substrate 103. The fourth grounding conductor 104*d* is formed inside the generic substrate 103. The fifth grounding conductor 104*e* is formed on the substrate's surface 204.

The second feeder line 107 includes a feeder line 107*a* and a feeder line 107*b*. The feed element 108 includes a feed element portion 108*a* and a feed element portion 108*b*. At least a part of the second feeder line 107 is provided inside or on the second portion 202 of the substrate 101. In the example shown in FIG. 3, a part of the second feeder line 107 is located on or inside the substrate 102*b* included in the second portion 202. The remaining portion of the second feeder line 107 is provided on or inside the substrate 102*b* included in the first portion 201.

The substrate 101 is composed mainly of dielectric material. Examples include resin substrates of flame retardant type 4 (FR-4), polytetrafluoroethylene (PTFE), modified polyphenylene ether (PPE) and the like; film substrates made mainly of resin foam, liquid crystal polymer, polyimide and the like; ceramic substrates; and glass substrates. The substrate 101 may also be a flexible substrate with flexibility.

The substrate 101 in the antenna device 100 includes a substrate's surface 203, a substrate's surface 204, and a substrate's surface 205. For example, the substrate's surface 203 may have surface mount technology (SMT) components and electronic circuits mounted on it, and the substrate's surface 204 may have the fifth grounding conductor 104*e* formed on it. The antenna device 100 may include a plurality of grounding conductors, and the grounding conductors may be formed not only on but inside the substrate. The grounding conductors should not necessarily be formed on or inside the substrate. For instance, a conductor via may be formed in the substrate and brought into conduction for grounding by making it into contact with or soldering it to a grounding conductor located outside the substrate.

The substrate 101 should not necessarily be composed of a single dielectric material, but may be composed of a combination of a plurality of materials. For instance, a substrate may be composed of a plurality of identical dielectric materials bonded together with a prepreg or bonding film. Alternatively, the substrate may be composed of a plurality of dielectric materials having different electrical characteristics, such as a high-frequency substrate made of low dielectric loss material and a generic substrate such as an FR-4 substrate bonded and laminated together with prepregs, bonding films, or the like.

In the antenna device 100 according to the first embodiment, the substrate 101 is composed of a laminated substrate of the high-frequency substrate 102 and generic substrate 103. The high-frequency substrate 102 is composed of a laminated substrate of the substrates 102*a*, 102*b*, and 102*c*. The generic substrate 103 is composed of a laminated substrate of the substrates 103*a* and 103*b*.

When a substrate formed from a high-frequency substrate and a generic substrate bonded together is used to compose an antenna device, it is possible to form feeder lines, feed elements, directors, and the like for high frequencies on the high-frequency substrate and electronic circuits on or inside the generic substrate, for example. A high-frequency substrate is a substrate suitable for transmission of high-frequency (e.g., frequencies of 1 GHz or higher) signals and is composed of a material that has a low dielectric loss tangent and low transmission loss to high frequencies. Forming feeder lines, feed elements, directors, and the like on a high-frequency substrate reduces dielectric loss and enhances the characteristics of the antenna device. Although the antenna device may be composed of only a high-frequency substrate, high-frequency substrates, which use materials with the aforementioned characteristics, are generally more expensive than generic substrates. Generic substrates are less affected by transmission loss and the like to low frequencies (e.g., frequencies below 1 GHz), and are less expensive because they are composed of low-cost materials such as FR-4 but are not suitable for high frequencies due to their high transmission loss. For this reason, forming an electronic circuit on or inside the generic substrate while forming a feed element and director on the high-frequency substrate makes it possible to reduce the manufacturing cost of the antenna device while enhancing the characteristics of the antenna device.

The electronic circuit mounted on the substrate 101 is a circuit having, for example, at least one of the following functions: a transmission function for transmitting signals via the feed element 108 and the director 109, and a reception function for receiving signals via the feed element 108 and the director 109. An electronic circuit includes, for example, an integrated circuit (IC) chip. The electronic circuit includes, for example, a radio frequency integrated circuit (RFIC) chip that processes the high-frequency signals transmitted or received by the antenna device 100.

The antenna device 100 has a first feeder line 105 and a second feeder line 107. Examples of feeder lines include microstrip lines, strip lines, coplanar lines, coplanar lines with ground (coplanar lines with a grounding conductor facing signal lines), and slot lines. Other examples of feeder lines include feeder lines formed from two rows of conductor vias continuously aligned on parallel plates or dielectric substrate with metal top and bottom surfaces, which are called post-wall waveguides or substrate integrated waveguides (SIWs). The antenna device 100 may, for example, have a plurality of feeder lines having the same or different shapes. The feeder lines may be formed inside the substrate 101 or on the substrate 101. In the examples shown in FIGS. 1 to 3, the first feeder line 105 is composed of a strip line which is a conductive pattern formed inside the high-frequency substrate 102 in the second portion 202 and uses the first grounding conductor 104*a* and the second grounding conductor 104*b* as a ground conductor. The second feeder line 107 is composed of a parallel two-wire line which is a conductive pattern formed inside the high-frequency substrate 102 spanning the first portion 201 and the second portion 202. The first feeder line 105 and the second feeder line 107 both transmit signals in a direction parallel to the Y-axis.

The first feeder line 105 and the second feeder line 107 are connected together, for example, through the balun 106. Herein, a balun is defined as any device that brings mutual conversion between balanced and unbalanced lines. In the antenna device 100 according to the first embodiment, the first feeder line 105 is an unbalanced line and the second feeder line 107 is a balanced line.

In the antenna device 100 according to the first embodiment, the balun 106 shown in FIG. 1 is composed of a strip line which is a conductive pattern formed inside the high-frequency substrate 102 in the second portion 202 and uses the first grounding conductor 104*a* and the second grounding conductor 104*b* as a ground conductor. The balun 106 may be made, for example, in such a way that a strip line is branched into two branches, and the electrical length of, of the two branched lines, the line 106*a* along the +X-axis direction is made longer than the electrical length of the line 106*b* along the −X-axis direction by about ½ of the operating wavelength of the feed element 108 (i.e., the wavelength of radio waves transmitted and received by the antenna device 100) λ, and the two branched lines are connected to, for example, a parallel two-wire line (see the second feeder line 107). The balun 106 may also be made, for example, by electromagnetic field coupling a balanced line and an unbalanced line bent into a U-shape together and feeding power from the unbalanced line to the balanced line or in the opposite direction in a noncontact manner. It is also possible to construct a structure without a balun 106 depending on the antenna structure used.

The antenna device 100 according to the first embodiment includes a feed element 108. The feed element 108 includes, for example, a feed element portion 108*a* and a feed element portion 108*b*. The feed element 108 is connected to the end of the second feeder line 107. The feed elements may be formed inside the substrate 101 or on the substrate 101. For instance, the feed element 108 is a conductive pattern formed inside the high-frequency substrate 102 in the first portion 201. The feed element in the antenna device 100 according to the first embodiment may feed power in a noncontact manner, for example, by electromagnetic field coupling with a feeder line. The feed element may be formed across the first portion 201 and the second portion 202.

The feed element 108 has a conductive portion having a longitudinal direction along, for example, the X-axis shown in FIG. 1. The length of the entire feed element 108 (i.e., the length of a line parallel to the X-axis connecting the end of the feed element portion 108*a* adjacent to the +X-axis and the end of the feed element portion 108*b* adjacent to the −X-axis, which is shown as $L_6$ in FIG. 1) is preferably made equal to about ½ of the operating wavelength of the feed element 108 (i.e., the wavelength of radio waves transmitted and received by the antenna device 100) λ. The feed element 108 is fed through the second feeder line 107, and a resonance current similar to that of a half-wavelength dipole antenna flows through the feed element 108. In other words, the feed element 108 operates as a dipole antenna formed as a conductive pattern. Although FIG. 1 shows the feed element 108 as a straight line, the shape of the feed element 108 can be other shapes such as meander, loop, or arc.

The antenna device 100 according to the first embodiment includes at least one director 109 distanced from the feed element 108 in a particular direction (in FIG. 1, in the +Y-axis direction as viewed from the feed element 108). The directors 109 is disposed with respect to the radiation direction of the feed element 108. One director 109 is shown in FIG. 1. For example, the director 109 is a conductive pattern formed inside the high-frequency substrate 102 in the first portion 201. The director 109 has a conductive portion having a longitudinal direction along, for example, a direction orthogonal to the radiation direction (along the X-axis in FIG. 1). Although FIG. 1 shows the director 109 as a straight line, the shape of the director 109 can be other shapes such as U shape, meander, loop, or arc. The director may be formed across the first portion 201 and the second portion 202.

The length of the director 109 is preferably shorter than that of the feed element 108.

The feed element 108 and the director 109 are preferably arranged in such a manner that their longitudinal directions are parallel or approximately parallel. The distance between the feed element 108 and the director 109 (the minimum distance between the feed element 108 and the director 109) $d_1$ is preferably 0.2 to 0.3 times the operating wavelength λ of the feed element 108.

The director 109 and the feed element 108 may be either in the same plane or different planes. Similarly, if the antenna device includes a plurality of directors (see FIG. 7 which will be described below), the directors and the feed element 108 may be either in the same plane or different planes.

As shown in FIG. 3, the antenna device 100 according to the first embodiment includes the first grounding conductor 104*a*, grounding conductor 104*b*, grounding conductor 104*c*, grounding conductor 104*d*, and grounding conductor 104*e* distanced in the direction opposite to the radiation direction (i.e., the +Y-axis direction) as seen from the feed element 108. The grounding conductors 104*a* to 104*e* have outer edges (end surfaces) Ta, Tb, Tc, Td, and Te parallel to the X-axis, that is, outer edges Ta, Tb, Tc, Td, and Te parallel to the longitudinal directions of the feed element 108 and director 109. In the antenna device 100, the outer edges Ta, Tb, Tc, Td, and Te are located in the same XZ plane (the boundary plane between the first portion 201 and the second portion 202), but may be located in different planes. In addition, the outer edges Ta, Tb, Tc, Td, and Te may have curved or uneven surfaces, for example.

The grounding conductors 104*a* to 104*e*, particularly the outer edges Ta to Te of these grounding conductors act as reflectors, for example, to reflect electromagnetic waves radiated from the feed element 108 and electromagnetic waves arriving at the antenna device 100. The longitudinal direction of the feed element 108 and the outer edges Ta to Te of the grounding conductors used as reflectors are preferably parallel or approximately parallel. The distance between the feed element 108 and the reflectors (outer edges Ta to Te), i.e., the minimum distance between the feed element 108 and the reflectors ($d_2$ in FIG. 1) is preferably 0.2 to 0.3 times the operating wavelength λ of the feed element 108. The grounding conductors 104*a* to 104*e* including the outer edges Ta to Te used as reflectors and the feed element 108 may be either in the same plane or different planes. In the example in FIG. 1, the antenna device 100 has five grounding conductors having the outer edges to be used as reflectors; alternatively, it may include only one grounding conductor, or two to four or six or more grounding conductors.

Although the antenna device 100 includes a single antenna formed from a feed element 108 and a director 109 in the example shown in FIG. 1, the antenna device 100 may include a plurality of antennas. When the antenna device 100 includes a plurality of antennas, the antennas may have either the same shape or different shapes.

For instance, when the antenna device has two antennas, one of the antennas may be an antenna as that in the antenna device 100 formed from a feed element 108 and a director 109 which are composed of a conductive pattern. The other antenna may be composed, for example, of a feeder line, a feed element, and a director in such a manner that a SIW is provided as the feeder line and the feed element formed from a conductive pattern and vias is provided in an open-end of the SIW provided on the side surface of the substrate having the SIW, and the director formed from a conductive pattern and vias away from the feed element is provided.

Even in an antenna device with an antenna composed of a SIW, a feed element, and a director, the substrate of the antenna device has a first portion having a first thickness and a second portion having a second thickness. In addition, at least one of at least a part of the feed element and at least a part of the director is formed in the first portion having the first thickness, thereby achieving the same effect as the antenna device 100.

As mentioned above, in FIG. 1, the director 109 is formed as at least one conductor or conductive pattern on or inside the substrate 101 so that it is located in the radiation direction as viewed from the feed element 108. In the antenna device 100 according to the first embodiment, the director 109 is located in the +Y-axis direction in FIG. 1 as viewed from the feed element 108. Thus, the antenna device 100 operates as an antenna having a target direction of radiation in the +Y-axis direction shown in FIG. 1.

As mentioned above, a reflector is formed on or inside the substrate 101 so that it is located on the opposite side of the radiation direction as seen from the feed element 108. As mentioned above, in the antenna device 100 according to the first embodiment shown in FIG. 1, the grounding conductors

104*a* to 104*e*, particularly the outer edges (side surfaces) Ta to Te act as reflectors and are located in the −Y-axis direction in FIG. 1 as viewed from the feed element 108. Thus, the antenna device 100 acts as an antenna having a target direction of radiation in the +Y-axis direction shown in FIG. 1.

The antenna device 100 only needs to include at least one of a director and a reflector. For example, even when the antenna device 100 shown in FIG. 1 does not include a director 109, but a feed element 108 and grounding conductors 104*a* to 104*e* that act as reflectors, the antenna device 100 acts as an antenna having a target direction of radiation in the +Y-axis direction shown in FIG. 1.

In FIG. 1, the antenna device 100 according to the first embodiment includes vias 110*a*, 110*b*, 110*c*, and 110*d*. Each via is formed for the purpose of conduction between layers of a multilayer substrate and is generally formed by metal plating a hole drilled in the substrate. In the antenna device 100, with the vias 110*a* to 110*d*, conduction is established between the grounding conductors 104*a* to 104*e* that constitute the grounding conductor 104. The vias 110*a* to 110*d* are all equal in diameter and aligned parallel to the X-axis.

The antenna device 100 according to the first embodiment will be described below in comparison with the antenna device according to a comparative example.

Figure 4:
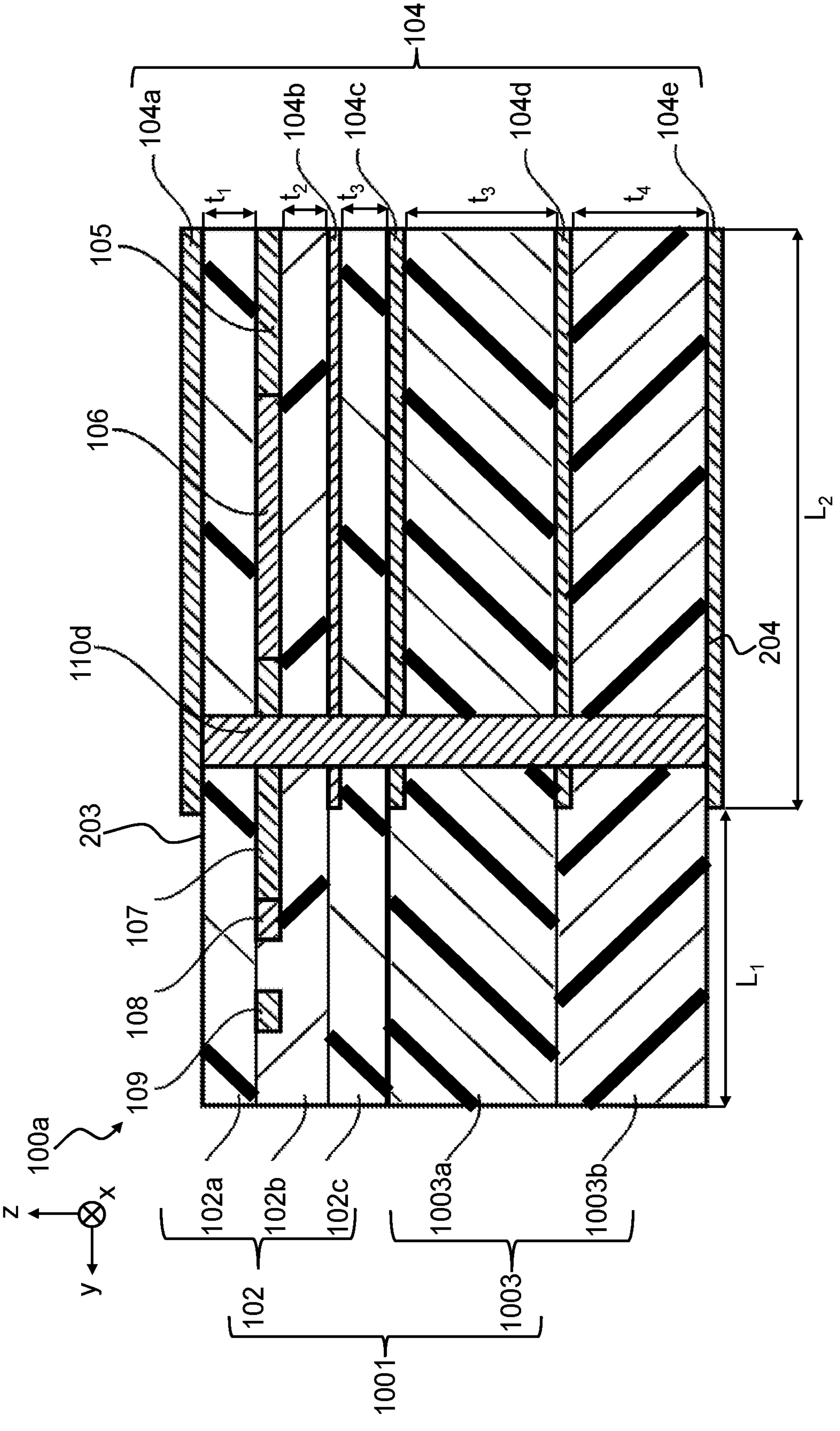
FIG. 4 is a cross-sectional view of the antenna device according to a comparative example.

FIG. 4 is a cross-sectional view schematically showing the antenna device 100*a* according to the comparative example. The main difference from the configuration of the antenna device 100 shown in FIGS. 1 and 3 is that the configuration of the generic substrate 1003 shown in FIG. 4 differs from that of the generic substrate 103 shown in FIGS. 1 and 3. As the other configurations are basically the same as in FIGS. 1 and 3, components having the same functions as in FIGS. 1 and 3 are denoted by the same reference numerals as in these drawings, and their detailed description will be omitted.

When an antenna device is formed by laminating a high-frequency substrate and a generic substrate together, as in the antenna device 100*a* according to the comparative example shown in FIG. 4, the high-frequency substrate 102 and the generic substrate 1003 are typically configured to have the same shape. A typical way of laminating substrates is that a bonding film or prepreg is sandwiched between the substrates to be laminated, and the work then undergoes bonding by applying heat and pressure using a lamination press machine or the like. During bonding, pressure is preferably applied evenly to the entire substrate using a press machine, and for this reason, it is preferable that all substrates to be laminated have an approximately identical shape.

However, in the configuration of the antenna device 100 according to the comparative example, the thickness of, of the substrate 1001, a part of the substrate where the feed element 108 and the director 109 are formed is thicker than the that of a part of the substrate where the feed element 108 and the director 109 are formed in the antenna device 100 according to the first embodiment (the first portion 201). In the antenna device 100*a* according to the first embodiment, the thickness of the first portion 201 where the feed element 108 and the director 109 are formed approximately equal to that of the high-frequency substrate 102. Meanwhile, in the antenna device 100*a* according to the comparative example, the thickness of the substrate 1001 is not dependent on the position and is approximately equal to the combined thickness of the high-frequency substrate 102 and the generic substrate 1003. Hence, in the antenna device 100*a* according to the comparative example, the thickness of a part of the substrate where the feed element 108 and the director 109 are formed is approximately equal to the combined thickness of the high-frequency substrate 102 and the generic substrate 1003.

The thickness of an area of the substrate where at least part of the feed element or director is formed affects the operating characteristics of the feed element and director. If the thickness of the substrate is sufficiently small in relation to the operating wavelength λ of the feed element, the electrical properties of the substrate (e.g., relative permittivity) have little impact on the operation of the feed element and director.

However, in high-frequency bands such as the millimeter wave band, the thickness of the substrate and the operating wavelength λ of the feed element are about the same degree. The higher the relative permittivity of the area where at least part of the feed element or director is formed, the more difficult it becomes to achieve impedance matching between the feed element and director and the free space, making it difficult to design an antenna device that achieves the desired target direction of radiation. In addition, the longer the electrical length from the surface of the substrate to the feed element or director, the more difficult it becomes to achieve impedance matching between the feed element and director and the free space, making it difficult to design an antenna device that achieves the desired target direction of radiation. In other words, in the area of the substrate where at least a part of the feed element or director is formed, the substrate thickness is preferably thin and the relative permittivity of the substrate is preferably low.

In the antenna device 100 according to the first embodiment shown in FIGS. 1 and 3, the distance from the feed element 108 and director 109 to the substrate's surface of the substrate 101 located in the +Z-axis direction, i.e., the substrate's surface 203 is approximately equal to the thickness of the substrate 102*a*. In addition, the distance from the feed element 108 and director 109 to the substrate's surface of the substrate 101 located in the −Z-axis direction, i.e., the substrate's surface 205 is approximately equal to the combined thickness of the substrates 102*b* and 102*c*.

Meanwhile, in the antenna device 100*a* according to the comparative example, the distance from the feed element 108 and director 109 to the substrate's surface of the substrate 1001 located in the +Z-axis direction, i.e., the distance from the feed element 108 and director 109 to the substrate's surface 203 is approximately equal to the thickness of the substrate 102*a*. The distance from the feed element 108 and director 109 to the substrate's surface of the substrate 1001 located in the −Z-axis direction, i.e., the distance from the feed element 108 and director 109 to the substrate's surface 204 is approximately equal to the combined thickness of the substrates 102*b* and 102*c* and generic substrate 1003.

In the antenna device 100*a* according to the comparative example shown in FIG. 4, compared with the antenna device 100 according to the first embodiment, the gap between the distance from the feed element 108 and director 109 to the substrate's surface located in the +Z-axis direction and the distance from the feed element 108 and director 109 to the substrate's surface located in the −Z-axis direction is large. In the antenna device 100 according to the first embodiment and the antenna device 100*a* according to the comparative example, the feed element 108 and director 109 are strip conductors and are approximately symmetric about a plane parallel to the XY plane shown in FIG. 1 which passes through approximately their centers. In these cases, when the thickness of the substrate is negligibly small with respect to the operating wavelength λ of the feed element, the radiation pattern transmitted or received by the feed element and director are symmetric or approximately symmetric about the XY plane.

However, in the antenna device 100*a* according to the comparative example shown in FIG. 4, the gap between the distance from the feed element 108 and director 109 to the substrate's surface located in the +Z-axis direction and the distance to the substrate's surface located in the −Z-axis direction is large. The influence of this difference causes, in high-frequency bands such as the millimeter wave band, the difference between the electromagnetic waves transmitted or received to/from the feeder 108 and director 109 in the +Z axis direction with respect to the XY plane and the electromagnetic waves transmitted or received to/from the feeder 108 and director 109 in the −Z-axis direction with respect to the XY plane. The problem is therefore that, for the pattern of radiation transmitted or received by the feeder 108 and director 109, the asymmetric shape between the patterns of radiation in the +Z- and −Z-axis directions with respect to the XY plane becomes larger.

According to the antenna device 100 according to the first embodiment, the thickness (first thickness) of the first portion 201 of the substrate 101 where at least part of the feed element 108 or director 109 is made thinner than the thickness (second thickness) of the second portion 202. This allows the gap between the electrical length from the feed element 108 and director 109 to the substrate's surface located in the +Z-axis direction and the electrical length to the substrate's surface located in the −Z-axis direction to be small compared with the antenna device 100*a* according to the comparative example. Thus, it is possible to solve the problem that the asymmetric shape between the patterns of radiation in the +Z- and −Z-axis directions with respect to the XY plane of the antenna device 100*a* according to the comparative example becomes larger.

In the antenna device 100 according to the first embodiment, the thickness of the first portion 201 does not depend on the thickness of the second portion 202. Therefore, using a substrate sufficiently thin compared to the operating wavelength λ of the feed element 108 for the first portion 201 makes it easy to design the antenna device that achieves the target direction of radiation compared with the antenna device 100*a* according to the comparative example.

Figure 5:
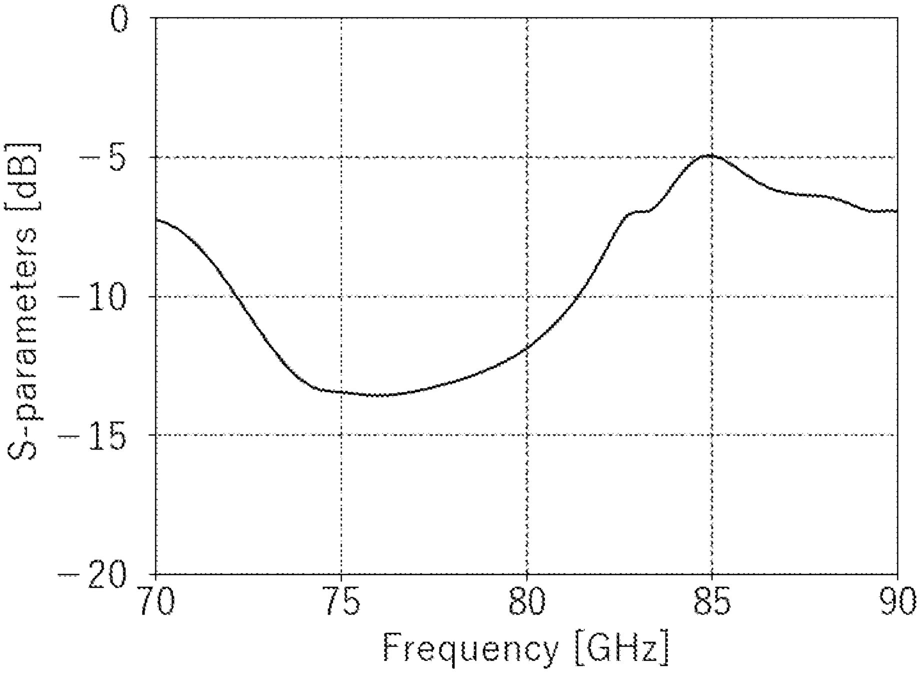
FIG. 5 is a diagram showing an example of a simulation analyzing the return loss characteristics of the antenna device shown in FIG. 1.

FIG. 5 shows an example of the results of electromagnetic field analysis of the return loss characteristics of the antenna device 100. The vertical axis represents the reflection coefficient $S_{11}$, the S-parameters (scattering parameters), and the horizontal axis represents the frequency. In FIG. 5, the frequency at which $S_{11}$ reaches a minimum value can be said to be the operating frequency f of the antenna device 100 (i.e., a preferred frequency among the frequencies of radio waves transmitted or received by the antenna device 100). As shown in FIG. 5, the antenna device 100 provides good impedance matching in the band including 79 GHz.

The antenna device 100 according to the first embodiment and the antenna device 100*a* according to the comparative example transmit or receive horizontally polarized waves, i.e., polarized waves parallel to the XY plane shown in FIG. 1.

Figure 6A:
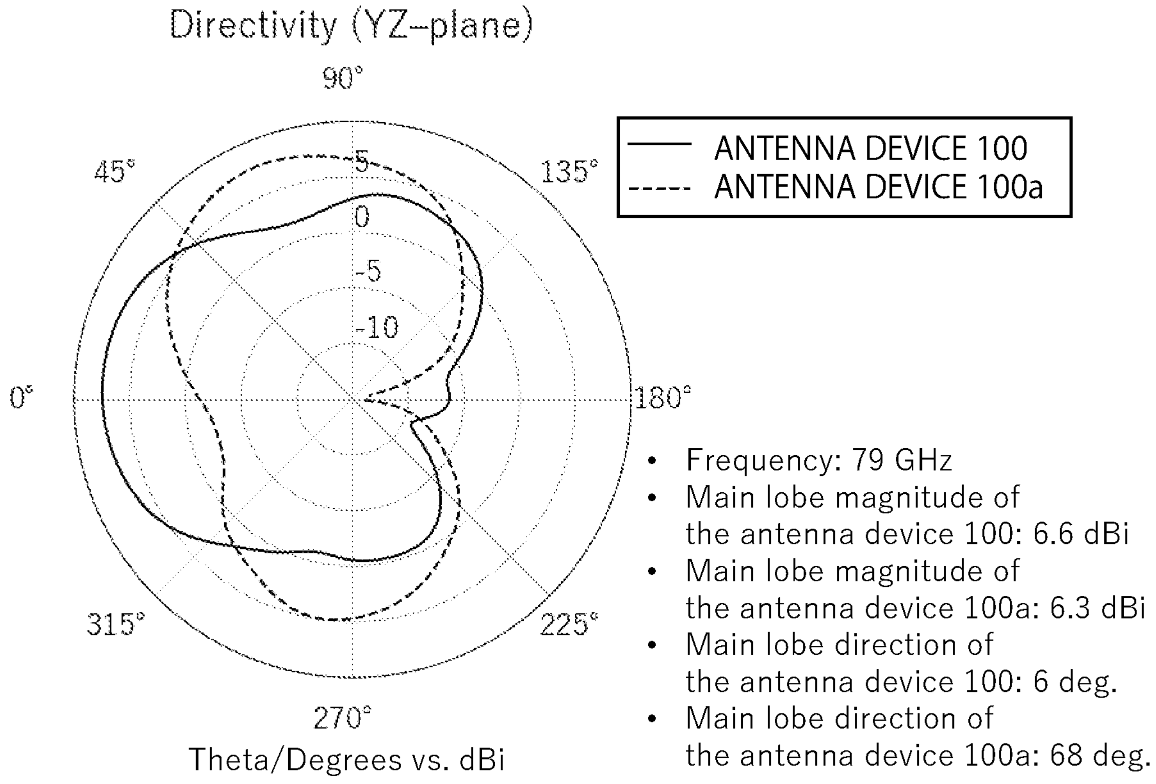
FIG. 6A is a diagram showing electromagnetic field analysis results of radiation directivity on the YZ plane for the antenna device according to the first embodiment and the antenna device according to the comparative example.

FIG. 6A shows an example of the results of electromagnetic field analysis of the directivity of the polarized waves on the YZ plane in the antenna device 100 and antenna device 100*a*.

Figure 6B:
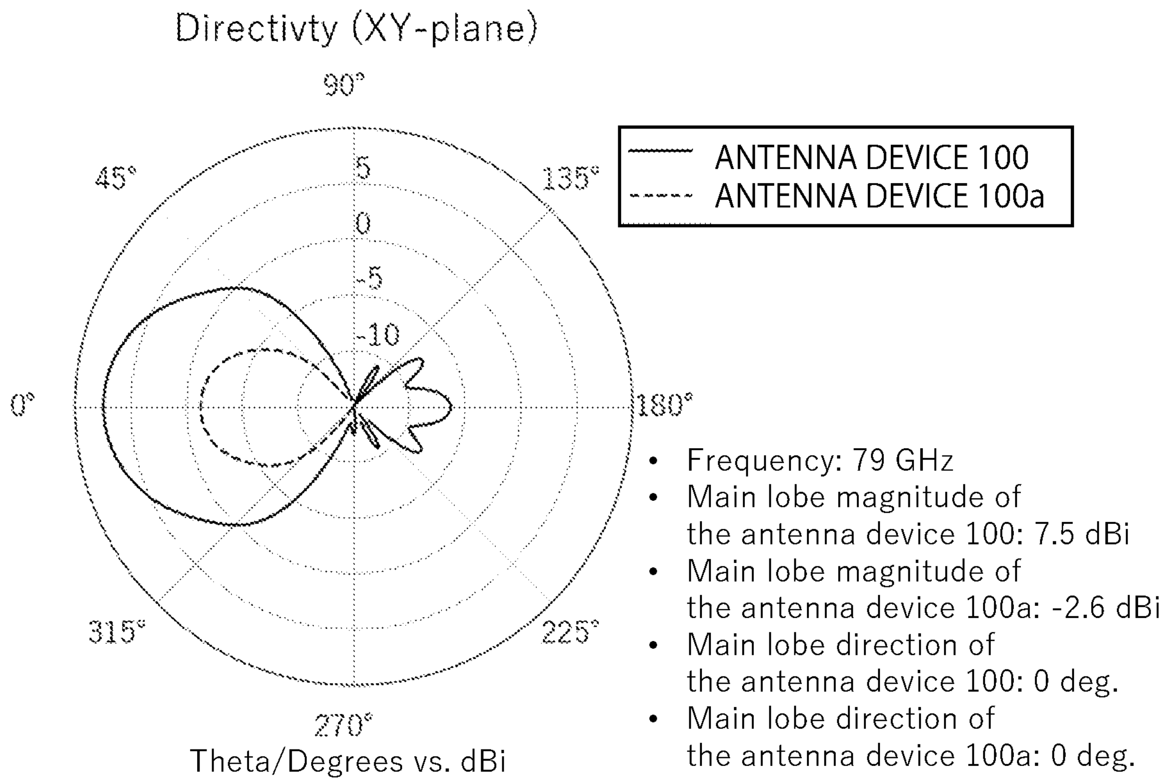
FIG. 6B is a diagram showing electromagnetic field analysis results of radiation directivity on the XY plane for the antenna device according to the first embodiment and the antenna device according to the comparative example.

FIG. 6B shows an example of the results of electromagnetic field analysis of the directivity of the polarized waves on the XY plane in the antenna device 100 and antenna device 100*a*.

In FIGS. 6A and 6B, the solid line represents the directivity gain of the antenna device 100 at the operating frequency f (=79 GHz) shown in FIG. 5, and the dashed line represents the directivity gain of the antenna device 100*a*.

In FIG. 6A, θ (Theta) represents, in the YZ plane, the angle between any direction in the plane containing the direction indicated by θ and the Y-axis, and the Y-axis. θ is defined as 0° in the +Y-axis direction. As mentioned above, the antenna device 100 operates as an antenna having the target direction of radiation in the +Y-axis direction shown in FIG. 1. As shown in FIG. 6A, regarding the directivity gain of the antenna device 100 in the YZ plane, the direction of maximum directivity gain is the direction tilted 6° from the +Y-axis direction to the +Z-axis direction. Meanwhile, regarding the directivity gain of the antenna device 100*a* in the YZ plane, the direction of maximum directivity gain is the direction tilted 68° from the +Y-axis direction to the +Z-axis direction.

In FIG. 6B, θ (Theta) represents the angle between any direction in the plane containing the direction indicated by θ and the Y-axis, and the Y-axis. θ is defined as 0° in the +Y-axis direction. In FIG. 6A above, in the antenna device 100*a*, the direction of maximum directivity gain is tilted significantly from the +Y-axis direction; consequently, as shown in FIG. 6B, the directivity gain of the antenna device 100*a* in the +Y-axis direction on the XY plane is 2.6 dBi. Meanwhile, in the antenna device 100, the directivity gain in the +Y-axis direction on the XY plane is 7.5 dBi. The antenna device 100 according to the first embodiment can be said to be capable of high-gain antenna operation in the target direction of radiation (i.e., +Y-axis direction) compared with the antenna device 100*a* according to the comparative example.

Referring to FIGS. 5, 6A, and 6B, when the S-parameters and antenna radiation patterns are analyzed, the dimensions of the components shown in FIGS. 1 to 3 in millimeters are as follows.

$L_1$: 2.40
$L_2$: 4.10
$L_3$: 3.70
$L_4$: 1.30
$L_5$: 0.13
$L_6$: 1.40
$L_7$: 0.13
$L_8$: 1.81
$L_9$: 0.13
$L_{10}$: 0.93
$L_{11}$: 0.13
$L_{12}$: 0.13
$L_{13}$: 0.13
$L_{14}$: 1.09
$L_{15}$: 0.52
$L_{16}$: 0.15
$t_1$: 0.18
$t_2$: 0.11
$t_3$: 0.13
$t_4$: 0.28
$t_5$: 0.37
$d_1$: 0.57
$d_2$: 0.57
$d_3$: 0.65
$d_4$: 0.28
$d_5$: 0.50

$d_6$: 0.50

$d_7$: 0.28

$D_1$: 0.25

The thickness of each conductor in the Z-axis direction of the antenna device 100 according to the first embodiment is 0.018 mm. The relative permittivity of the substrate 102 is 3.1, and that of the substrate 103 is 4.4.

As explained above, in the antenna device 100 according to the first embodiment, the substrate 101 has a first portion having a first thickness along a direction parallel to the surface of the substrate 101 and a second portion having a second thickness, and the first thickness is smaller than the second thickness. At least a part of the feed element 108 or at least a part of the director 109 is formed in the first portion 201. This can reduce radiation pattern distortion caused by the thickness of the first portion where at least a part of the feed element 108 or at least a part of the director 109 is formed. It can also reduce the difference between the target direction of radiation of the antenna device 100 and the direction of radiation of the antenna device 100, which enables high-gain antenna operation.

In addition, the antenna device 100 according to the first embodiment provides the aforementioned advantageous effects independently of the thickness of the second portion 202 having the second thickness. Therefore, there is no need to reduce the thickness of the second portion 202. This makes it possible to reduce restrictions on the number of substrate layers and substrate thickness of the second portion 202 when wiring power lines, those for control signals, and the like, forming electronic circuits, and mounting surface mount technology components, such as IC chips, in the second portion 202 having the second thickness. As a result, greater design freedom of the antenna device can be achieved.

(Modification 1)

Although the antenna device 100 according to the aforementioned first embodiment includes director, the antenna device 100 may include a plurality of directors.

Figure 7:
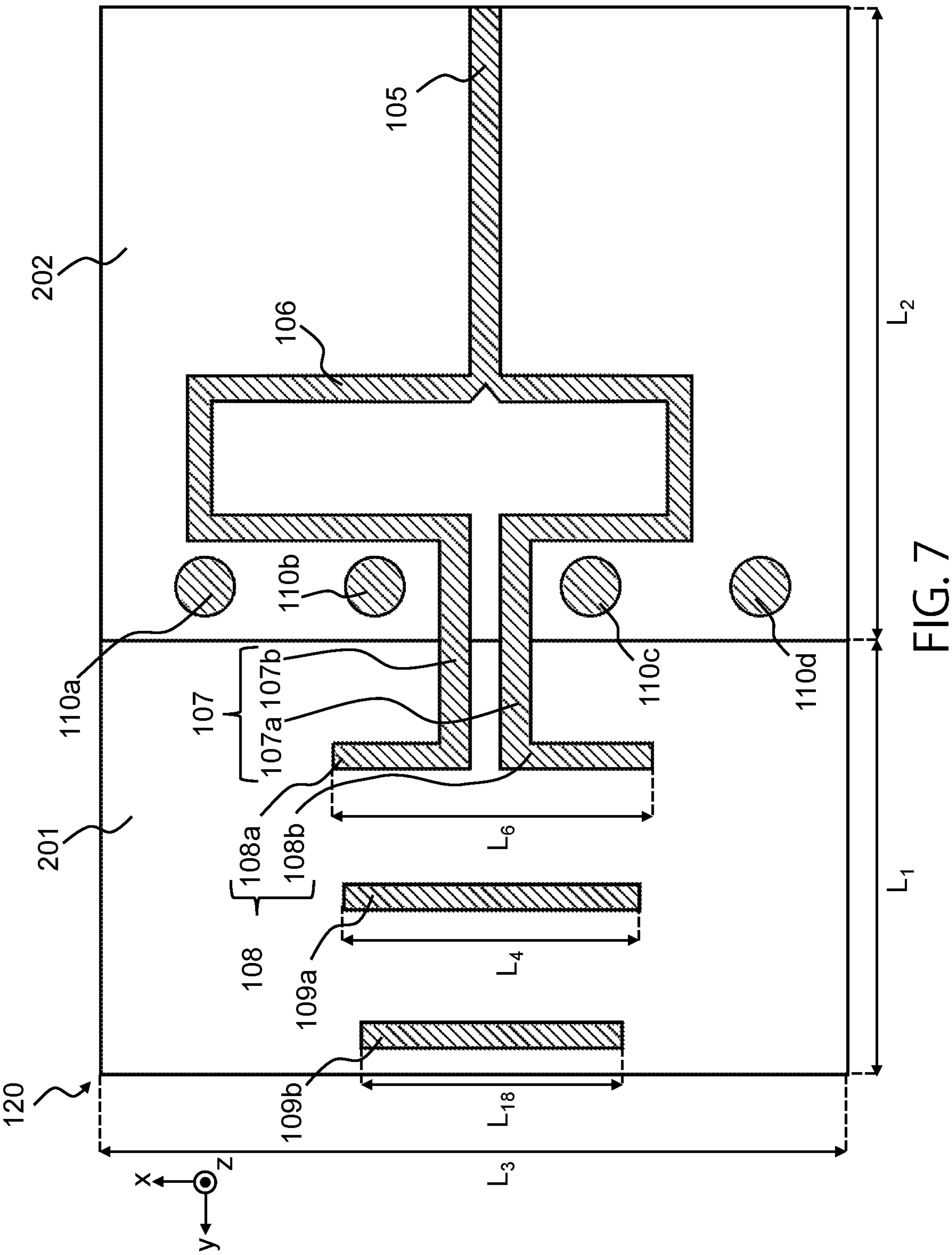
FIG. 7 is a plan view of an antenna device according to Modification 1 of the first embodiment.

FIG. 7 is a plan view schematically showing an antenna device 120 according to Modification 1 of the first embodiment, and the antenna device 120 has two directors. The antenna device 120 includes two directors: a director 109*a* and a director 109*b*. In this case, the length $L_{18}$ of the director 109*b* located at the second closest position from the feed element 108 is preferably shorter than the length $L_4$ of the director 109*a* located closest to the feed element 108. Similarly, when the antenna device includes three or more directors, the length of each director is preferably reduced gradually while the same relationship as $L_6$ and $L_4$ is maintained.

The feed element 108, director 109*a*, and director 109*b* are preferably arranged so that they are parallel or approximately parallel. The distance between the feed element 108 and the director 109*a* and the distance between the director 109*a* and the director 109*b* are both preferably 0.2 to 0.3 times the operating wavelength A of the feed element 108, as the distance $d_1$ between the feed element 108 and the director 109 according to the first embodiment (the shortest distance between the feed element 108 and the director 109). Although Modification 1 in FIG. 7 shows an example with two directors, the antenna device 100 according to the first embodiment may include three or more directors. In this case, the distance between the feed element and each director is preferably determined so that it becomes equal to $d_1$.

(Modification 2)

Although the antenna device 100 according to the aforementioned first embodiment uses the outer edge of the grounded conductor as a reflector, alternatively, for example, a reflector may be formed using a conductive pattern having a longitudinal direction along a direction orthogonal to the radiation direction (direction along the X-axis in FIG. 1), on or inside the substrate 101.

Figure 8:
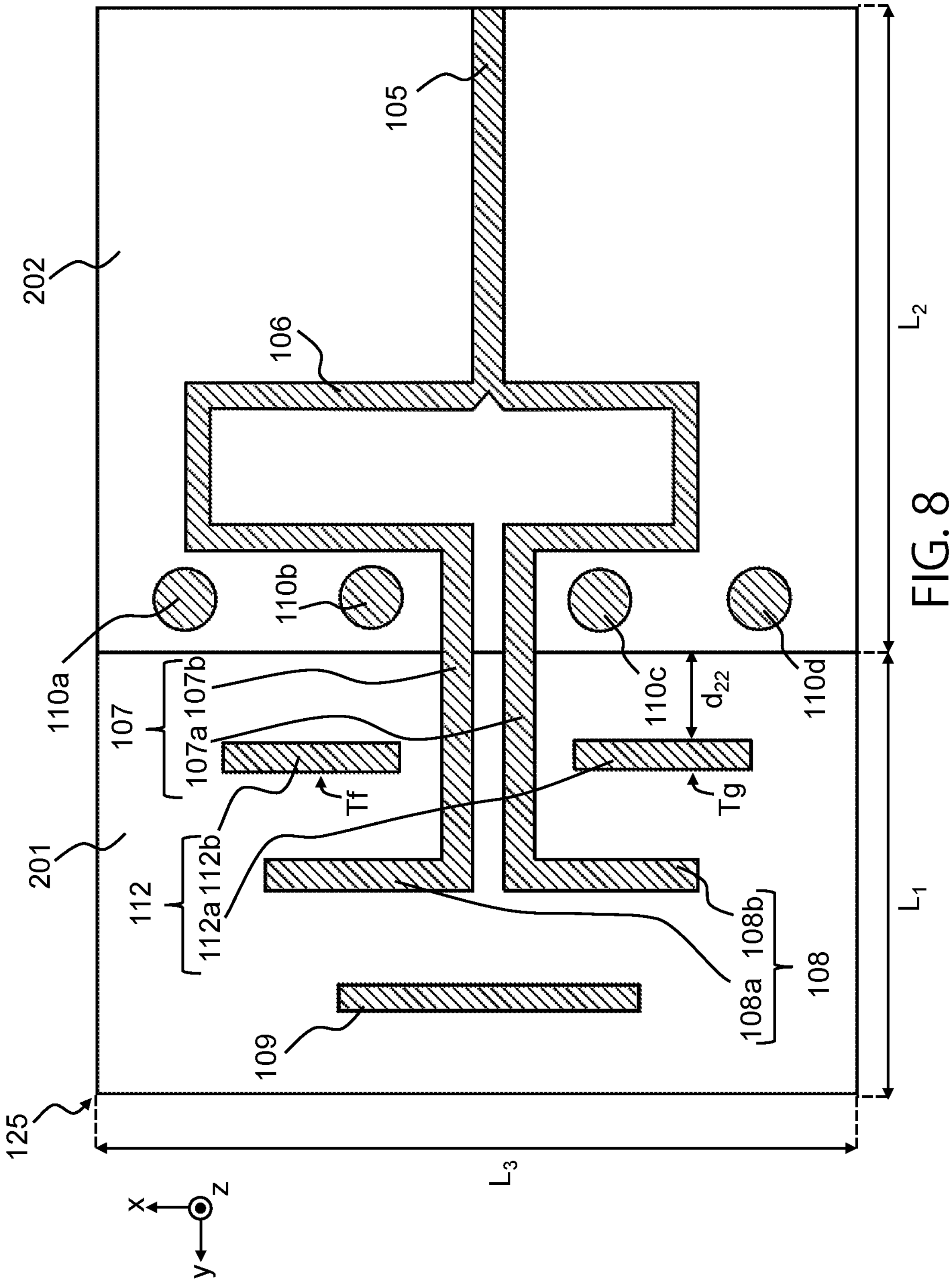
FIG. 8 is a plan view of the antenna device according to Modification 2 of the first embodiment.

FIG. 8 is a plan view schematically showing the antenna device 125 according to Modification 2 of the first embodiment. The same components as in FIGS. 1 to 3 are denoted by the same symbols as in these drawings and their detailed description will be omitted.

The antenna device 125 includes a reflector formed using a conductive pattern 112 having a longitudinal direction along a direction orthogonal to the radiation direction (direction along the X-axis in FIG. 1), on or inside the substrate 101. The reflector is located on the opposite side of the radiation direction as seen from the feed element. The conductive pattern 112 includes conductive patterns 112*a* and 112*b*. The conductive pattern 112 is made of the same material as the feed element 108, for example, and has the same thickness as the feed element 108. The conductive patterns 112*a* and 112*b* are formed on or inside the high-frequency substrate in the first portion 201.

The conductive patterns 112*a* and 112*b*, particularly side surfaces (outer edges) Tf and Tg adjacent to the feed element 108 with respect to the X-axis direction function as reflectors. The length of the conductive patterns 112*a* and 112*b* is preferably larger than the length of the feed element 108. The feed element 108 and the conductive patterns 112*a* and 112*b* are preferably arranged parallel or approximately parallel with each other, and the distance between the feed element 108 and the conductive patterns 112*a* and 112*b* (the shortest distance between the feed element 108 and the reflector: the distance $d_{22}$ in FIG. 1) is preferably 0.2 to 0.3 times the operating wavelength A of the feed element 108.

The reflectors formed using the conductive patterns 112*a* and 112*b* may be on the same or different planes as the feed element 108. The antenna device 100 may include a plurality of reflectors formed using a conductive pattern. When the reflectors are formed using a conductive pattern having a longitudinal direction along a direction orthogonal to the radiation direction (along the X-axis in FIG. 1), the shape of the reflectors may be U shape, meander shape, loop shape, arc shape, or the like. The conductive patterns 112*a* and 112*b* are not necessarily orthogonal to the radiation direction (direction along the X-axis in FIG. 1) and do not need to have a longitudinal direction.

Second Embodiment

An antenna device according to the second embodiment will be described with reference to FIGS. 9 and 10.

Figure 9:
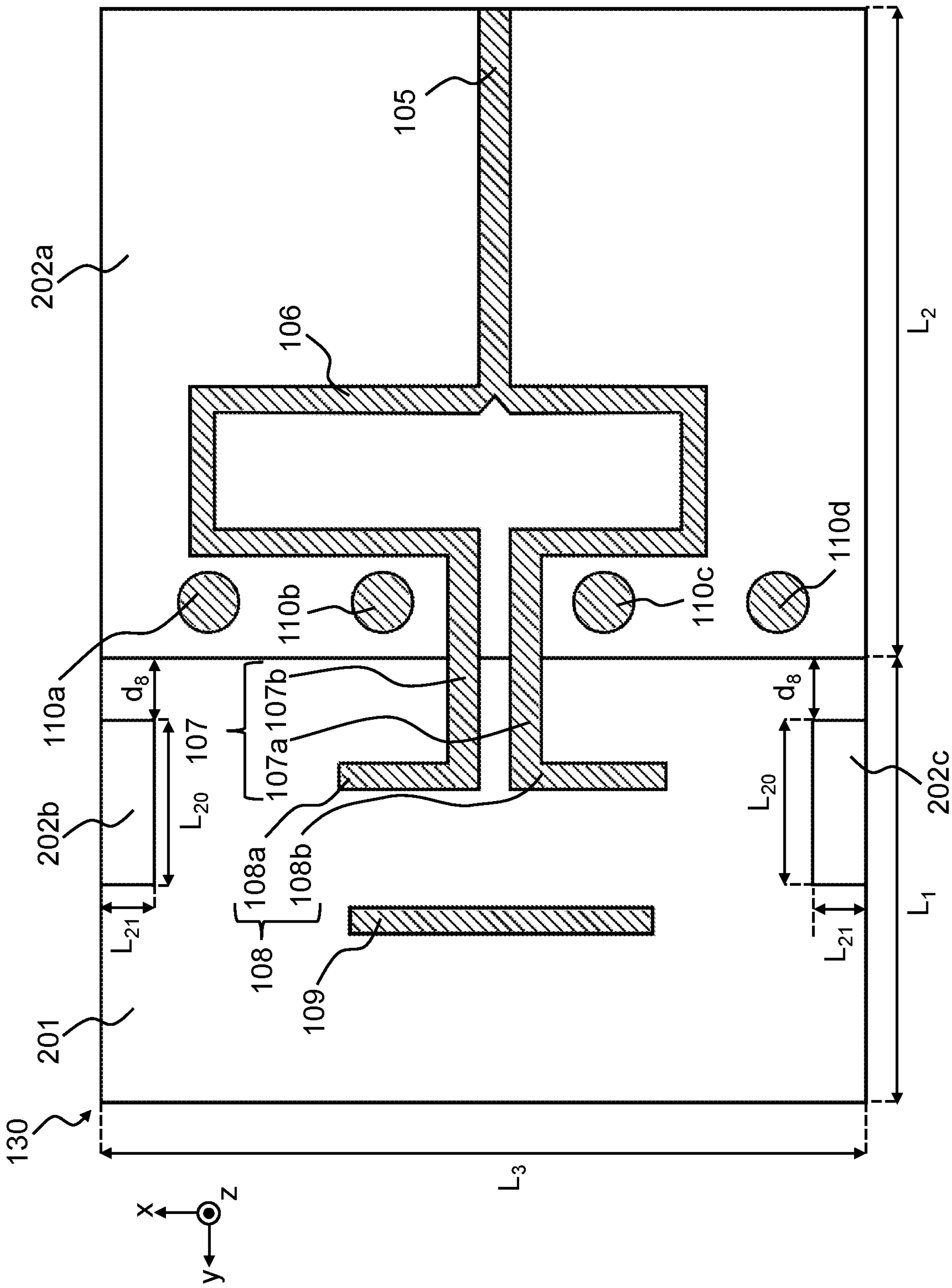
FIG. 9 is a plan view of an antenna device according to the second embodiment.

FIG. 9 is a schematic plan view of the antenna device 130 according to the second embodiment.

Figure 10:
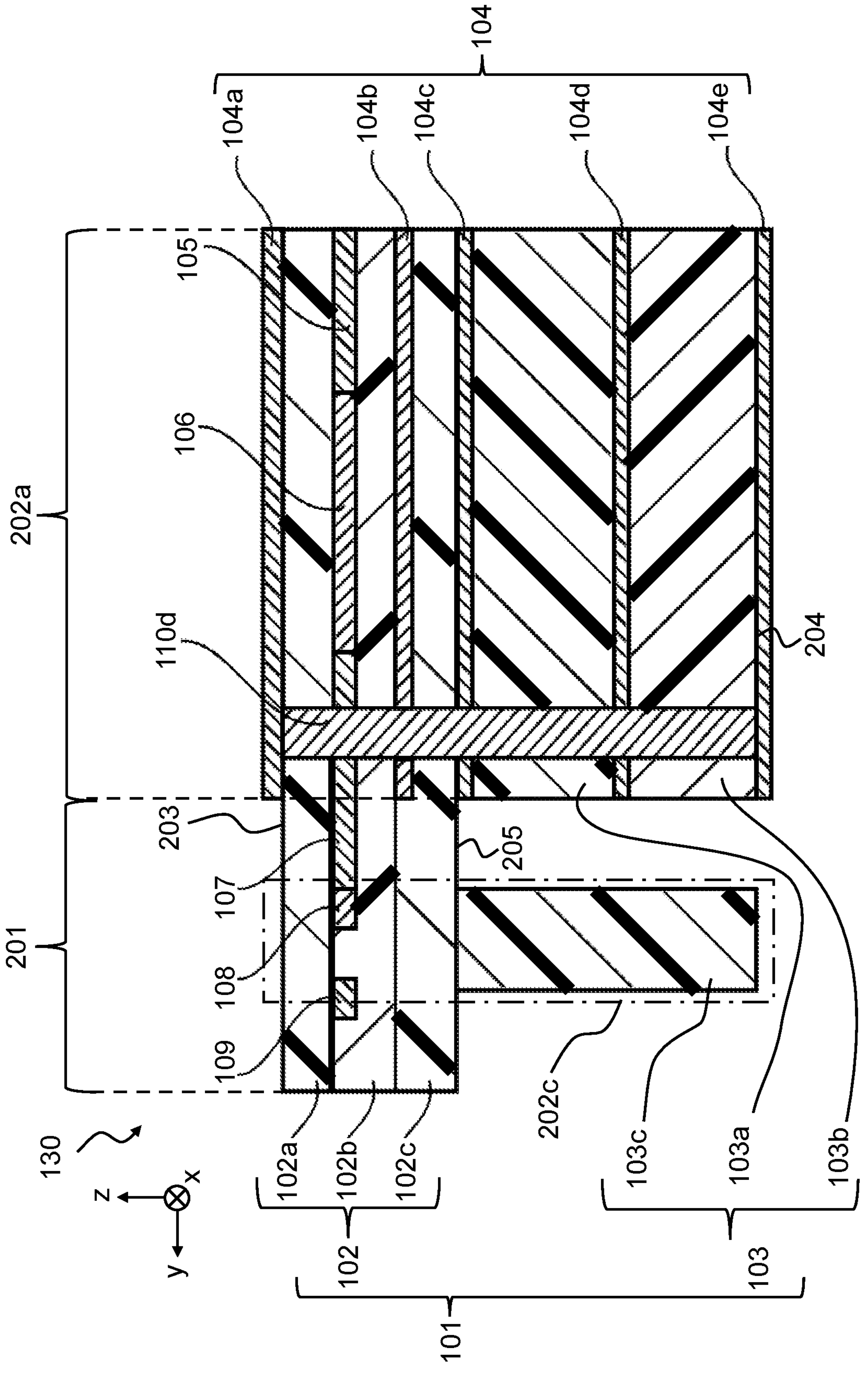
FIG. 10 is a cross-sectional view of the antenna device shown in FIG. 9.

FIG. 10 is a cross-sectional view schematically showing the antenna device 130 shown in FIG. 9.

Descriptions of, among the configurations in the second embodiment, configurations similar to those in the first embodiment will be omitted or simplified by referring to the description of the first embodiment above.

The antenna device 130 has a first portion 201 having a first thickness and a second portions 202*a*, 202*b*, and 202*c* having a second thickness. The antenna device 130 has a plurality of second portions. The antenna device 130 differs from the antenna device 100 according to the first embodiment in that it has a plurality of portions having the second thickness.

The thickness (first thickness) of the first portion 201 where at least a part of the feed element 108 or at least a part of the director 109 is formed is smaller than the second thickness of the second portions 202*a*, 202*b*, and 202*c* of the substrate.

The portion of the substrate having the first thickness is thinner than the portion of the substrate having the second thickness and may be deformed or broken, for example, when external force is applied to the substrate. For this reason, a plurality of portions having the second thickness are formed as in the antenna device 130 shown in FIG. 10, thereby reinforcing the first portion 201 having the first thickness.

In FIG. 10, the generic substrate 103 includes substrates 103*a*, 103*b*, and 103*c*. The substrate 103*c* is separated into two parts corresponding to the second portions 202*b* and 202*c* (see FIG. 9). The substrate 103*c* is placed in contact with, for example, the substrate's surface 205 of the substrate 101, and supports the high-frequency substrate 102 from the opposite side of the surface 203 of the high-frequency substrate 102, i.e., from the lower side (−Z-axis direction).

The second portion 202*a* having the second thickness includes a part of the high-frequency substrate 102 and the substrates 103*a* and 103*b*. The second portion 202*b* having the second thickness (see FIG. 9) and the second portion 202*c* having the second thickness include, for example, a part of the high-frequency substrate 102 and the substrate 103*c*. The second portions 202*a*, 202*b*, and 202*c* having the second thickness may have the same layer configuration or different layer configurations.

At least a part of the feed element 108 or at least a part of the director 109 is formed in the first portion 201 having the first thickness.

Figure 11:
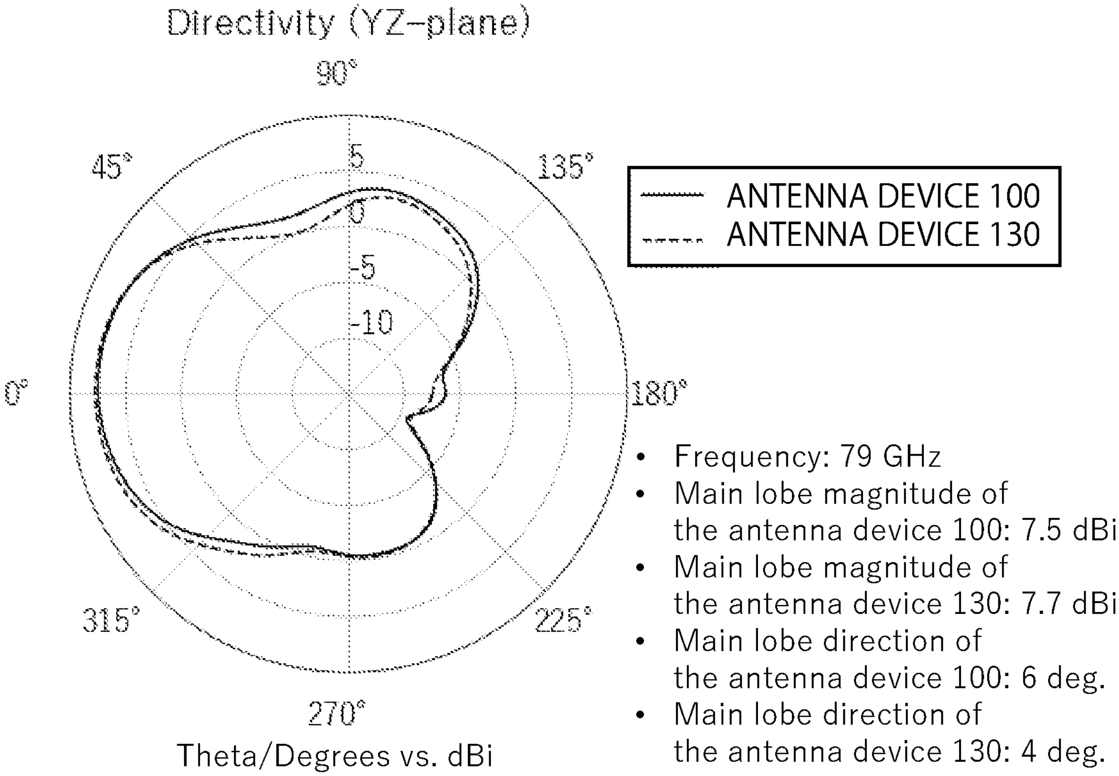
FIG. 11 is a diagram showing electromagnetic field analysis results of radiation directivity on the YZ plane for the antenna device according to the second embodiment.

FIG. 11 shows an example of the results of electromagnetic field analysis of the directivity of the polarized waves on the YZ plane of the antenna device 130 shown in FIG. 9. When the antenna radiation pattern is analyzed in the case of electromagnetic field analysis of directivity in FIG. 11, the dimensions of each component in millimeters shown in FIG. 9 are as follows.

$d_8$: 0.50

$L_{20}$: 1.00

$L_{21}$: 0.30

The other dimensions are equal to those of the antenna device 100 according to the first embodiment.

The results of the radiation pattern analysis shown in FIG. 11 show that the radiation patterns for both the antenna device 100 and antenna device 130 are generally the same. The analysis results in FIG. 11 show that even when the antenna device has a plurality of portions having the second thickness, it is possible to reduce the difference between the target direction of radiation (i.e., +Y-axis direction, 0° in FIG. 11) and the radiation direction, and achieve high-gain antenna operation.

(Modification)

Figure 12:
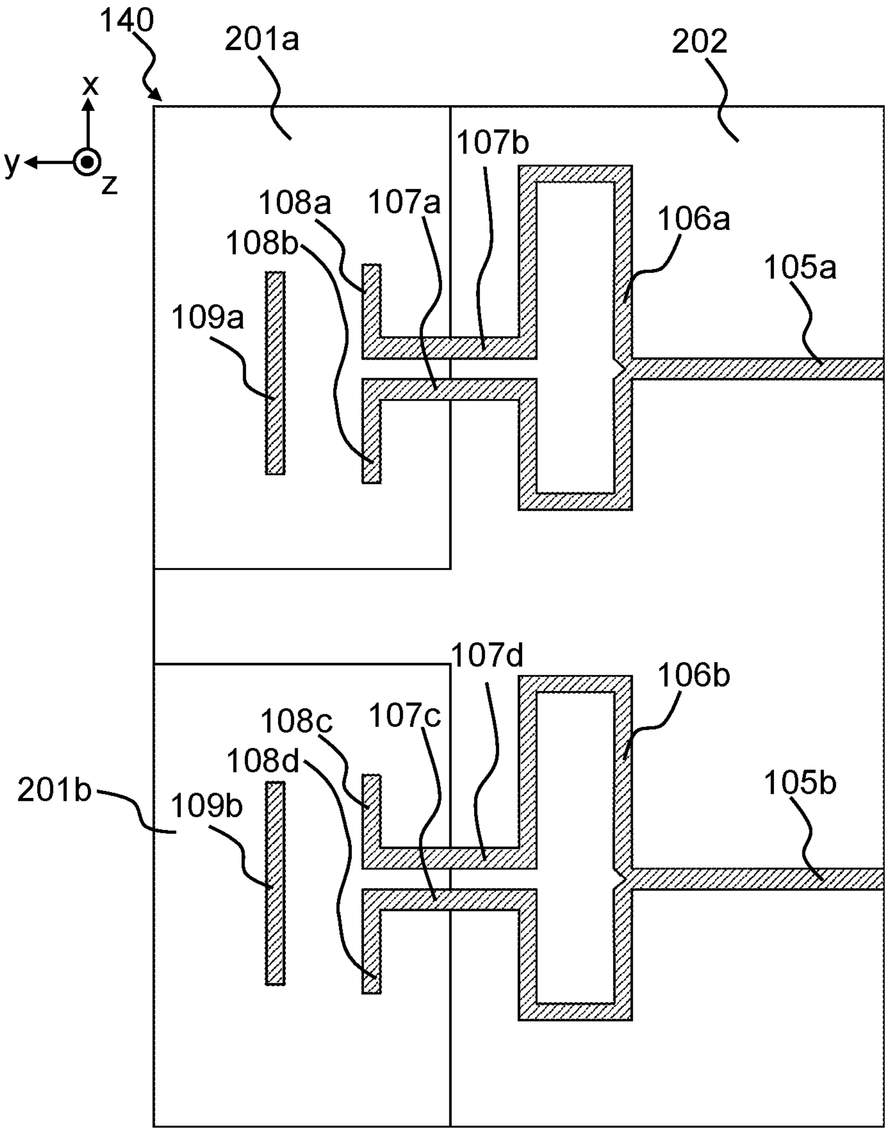
FIG. 12 is a plan view of an antenna device according to a modification of the second embodiment.

FIG. 12 is a plan view schematically showing an antenna device 140 according to a modification of the second embodiment. The antenna device 140 has a plurality of portions having the first thickness: first portions 201*a* and 201*b*. The antenna device 140 includes a plurality of antennas having different feeding points.

An antenna formed from a feed element portion 108*a*, a feed element portion 108*b*, and a director 109*a* is fed from the end on the +Y-axis side of the parallel two lines formed from feeder lines 107*a* and 107*b*. The antenna formed from the feed element portions 108*c* and 108*d* and the director 109*b* is fed from the end on the +Y-axis side of the parallel two-wire line formed from the feeder lines 107*c* and 107*d*.

The antenna device 140 includes first portions 201*a* and 201*b* having a first thickness, and a second portion 202 having a second thickness. This configuration also provides the effect of reinforcing the portions having the first thickness as in the antenna device 130. The first portions 201*a* and 201*b* are distanced in a direction parallel to the X-axis (third direction), but may also be distanced in a direction parallel to the Y-axis (second direction).

As in the third embodiment, the configuration with a plurality of portions having the first thickness can achieve high-gain antenna operation by reducing the difference between the target direction of radiation (i.e., the +Y-axis direction, 0° in FIG. 11) and the radiation direction.

Still another modification of the second embodiment can be a configuration including a plurality of portions having a first thickness and a plurality of portions having a second thickness. In this case also, high-gain antenna operation can be achieved by reducing the difference between the target direction of radiation (i.e., the +Y-axis direction, 0° in FIG. 11) and the radiation direction.

Third Embodiment

The antenna device according to the third embodiment will now be described with reference to FIG. 13.

Figure 13:
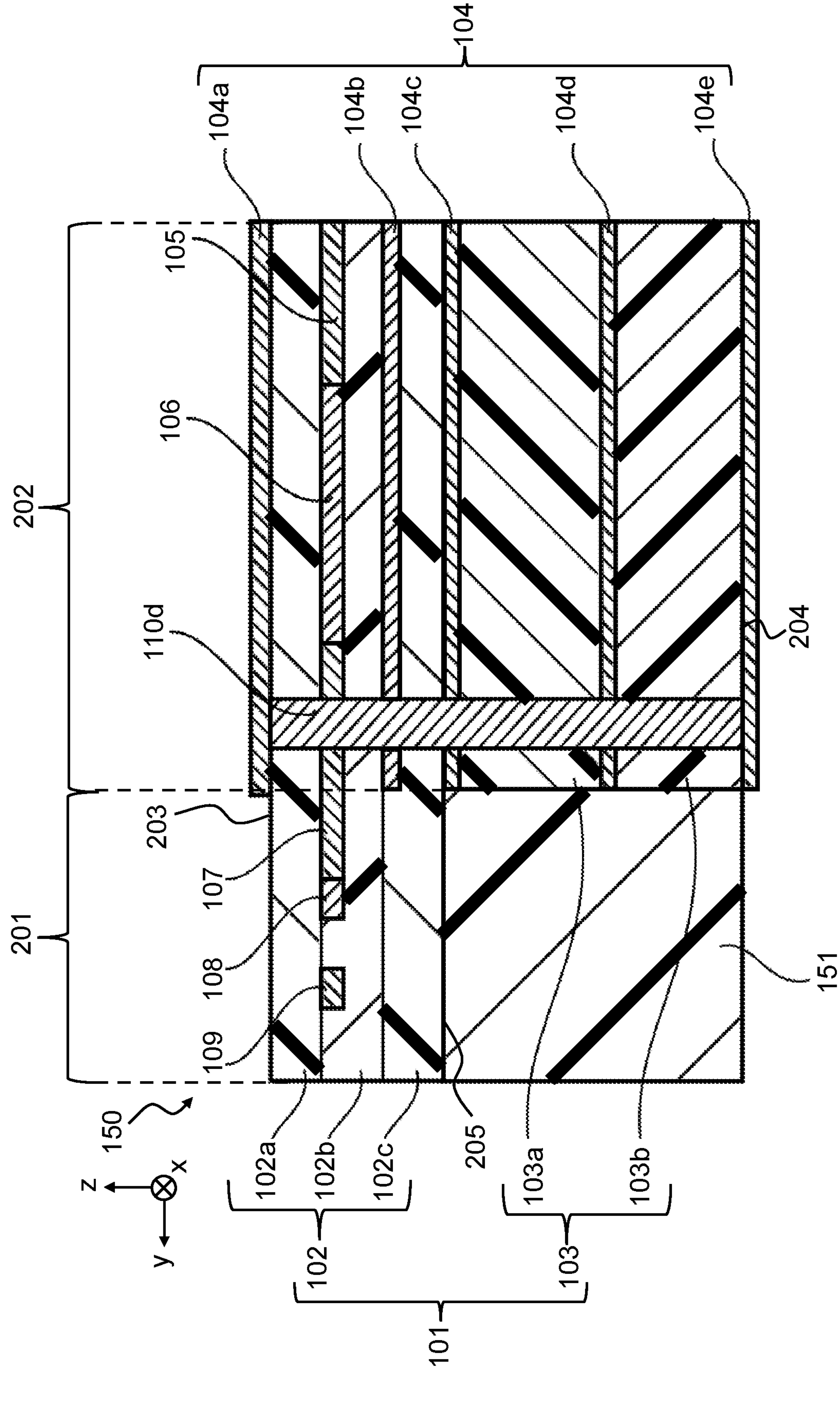
FIG. 13 is a cross-sectional view of an antenna device according to a third embodiment.

FIG. 13 is a cross-sectional view schematically showing an antenna device 150 according to the third embodiment. Descriptions of, among the configurations of the third embodiment, configurations similar to those in the first embodiment will be omitted or simplified by referring to the description of the first embodiment above.

In the antenna device 150, the thickness of the first portion 201 where at least a part of the feed element 108 or at least a part of the director 109 is formed (first thickness), i.e., the first thickness is smaller than the thickness of the second portion 202 (second thickness).

The first portion 201 having the first thickness has a smaller substrate thickness than the portion 202 having the second thickness and may thus be deformed or broken when external force is applied to the substrate. To avoid this, as in the antenna device 150, for example, the first portion 201 having the first thickness is reinforced with a low dielectric constant material 151 (dielectric layer). The low dielectric constant material 151 is in contact with the first portion 201 from the opposite side of the surface 203 of the substrate in a direction perpendicular to the surface of the substrate (first direction).

The antenna device 150 includes a low dielectric constant material 151. The relative permittivity of the low dielectric constant material 151 is lower than those of all substrates included in the substrate 101 (e.g., the substrates 102*a*, 102*b*, and 102*c* constituting the high-frequency substrate 102, and the substrates 103*a* and 103*b* constituting the generic substrate 103 in the antenna device 150). Examples of the low dielectric constant material include synthetic resins, such as polyurethane, polypropylene, polyimide, polystyrene, melamine resin, and silicone, and porous or foamed materials formed by foaming polymer compounds.

The thickness of the low dielectric constant material 151 is approximately equal to the thickness of the generic substrate 103. The length of the low dielectric constant material 151 in the X-axis direction is approximately equal to $L_3$ shown in FIG. 1, and its length in the Y-axis direction is approximately equal to $L_1$ shown in FIG. 1. The outer shape of the low dielectric constant material 151 viewed from the +Z-axis direction is, for example, approximately the same as the outer shape of the first portion 201 having the first thickness viewed from the +Z-axis direction (i.e., rectangular or square). The outer shape of the low dielectric constant material 151 viewed from the +Z-axis direction is not necessarily the same as the outer shape of the first portion 201 having the first thickness. For example, it may be larger or smaller than the first portion 201 having the first thickness.

The outer shape of the low dielectric constant material 151 viewed from the +Z-axis direction is not necessarily rectangular or square and may have, for example, convex or concave portions, and the outer edge of the low dielectric constant material 151 may have a curve. The low dielectric constant material 151 may have, for example, a cylindrical or rectangular cavity.

The antenna device 150 may have a plurality of portions having the first thickness like the antenna device 140 (see FIG. 12). The configuration in this case may include a low dielectric constant material in contact with each of the portions having the first thickness. In this case, the low dielectric constant material in the antenna device is not necessarily in contact with the entire area of each portion having the first thickness.

The low dielectric constant material 151 is placed in contact with the substrate's surface 205 of the substrate 101, for example. The low dielectric constant material 151 may be simply placed in contact with the substrate's surface 205 or, for example, fixed in place by bonding it with a material such as an adhesive or prepreg, or bonded adhesively with a material, such as an adhesive or double-sided tape. Alternatively, the low dielectric constant material placed in contact with the substrate's surface 205 of the substrate 101 may be placed by, for example, fixing it using a jig.

The thickness of, of the substrate in the antenna device 150, the substrate in the first portion 201 where at least a part of the feed element 108 or at least a part of the director 109 is formed, i.e., the first thickness is smaller than that of the second portion 202. This reduces the difference between the target direction of radiation of the antenna device 150 and the direction of radiation of the antenna device. In this case, the relative permittivity of the low dielectric constant material 151 is sufficiently low, so that even when the antenna device 150 includes a low dielectric constant material, the low dielectric constant material has a low impact on the impedance matching between the antenna and the free space. Therefore, even when the antenna device 150 includes the low dielectric constant material 151, as in the antenna device 100 according to the first embodiment, the difference between the target direction of radiation of the antenna device and the direction of radiation of the antenna device can be made smaller than in the antenna device according to the comparative example.

Figure 14:
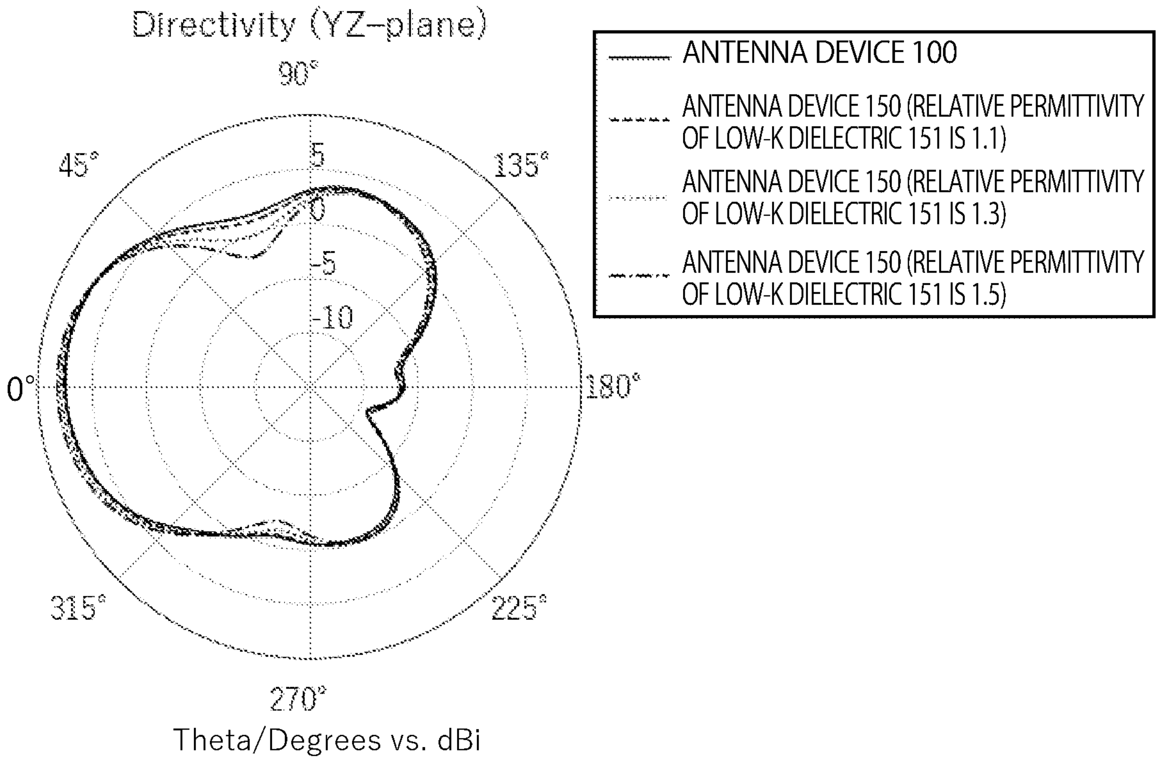
FIG. 14 is a diagram showing electromagnetic field analysis results of radiation directivity on the YZ plane for the antenna device according to the third embodiment.

FIG. 14 shows an example of the results of electromagnetic field analysis of the directivity of the polarized waves on the YZ plane shown in FIG. 13 in the antenna device 100 and antenna device 150. In the case of electromagnetic field analysis of directivity in FIG. 14, the dimensions of each component of the antenna device 150 are equal to those of the antenna device 100 according to the first embodiment.

The length of the low dielectric constant material 151 in the antenna device 150 in the X-axis direction is approximately equal to $L_3$ shown in FIG. 1 and the length in the Y-axis direction is approximately equal to $L_1$ shown in FIG. 1. The thickness of the low dielectric constant material 151 is approximately equal to that of the generic substrate 103. FIG. 14 shows the results of the analysis for the three cases the relative permittivity of the low dielectric constant material 151: 1.1, 1.3, and 1.5. Here, the analysis results were obtained with the same dimensions of the low dielectric constant material 151 independently of its relative permittivity, and the dielectric loss tangent of the low dielectric constant material 151 fixed at 0.001 independently of the relative permittivity.

The results in FIG. 14 show that although the shape of the radiation pattern differs depending on the relative permittivity of the low dielectric constant material 151, in any case the antenna device 150 has a maximum value around the target direction of radiation (i.e., +Y-axis direction, 0° in FIG. 14). The lower the relative permittivity of the low dielectric constant material, the closer the radiation pattern of the antenna device 150 is to the radiation pattern of the antenna device 100. However, even when the relative permittivity of the low dielectric constant material is 1.5, the antenna device 150 has a smaller difference between the target direction of radiation and the radiation direction than in the radiation pattern analysis results (results shown in FIG. 6A) of the antenna device 100*a* according to the comparative example. The aforementioned electromagnetic field analysis results demonstrate that the antenna device 150 with the low dielectric constant material 151 can also achieve high-gain antenna operation in the target direction of radiation.

(Modification)

Figure 15:
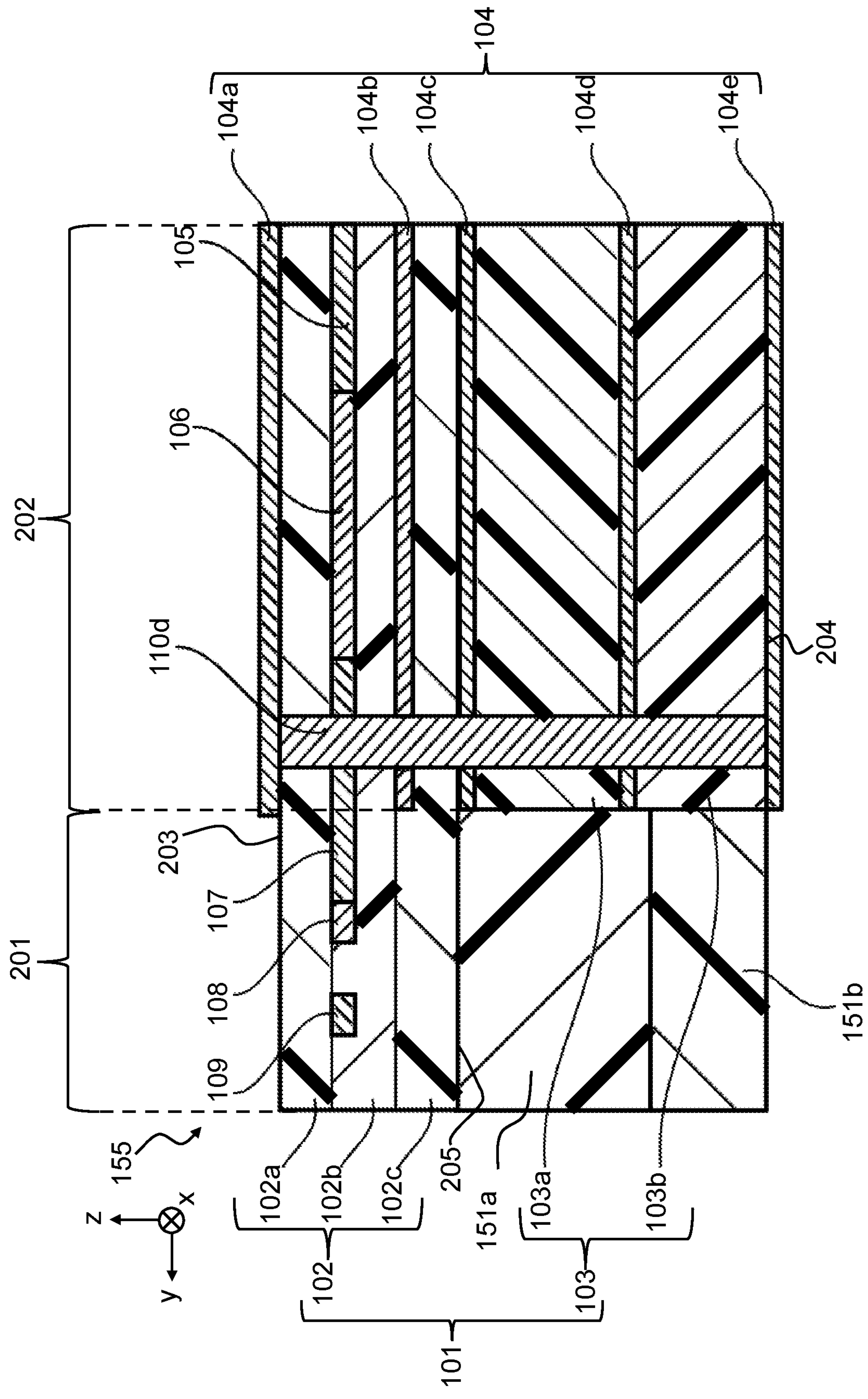
FIG. 15 is a cross-sectional view of the antenna device according to a modification of the third embodiment.

FIG. 15 is a cross-sectional view schematically showing an antenna device 155 according to a modification of the third embodiment.

The antenna device 155 includes a plurality of low dielectric constant materials 151*a* and 151*b*. These low dielectric constant materials may be made of the same material or different materials. These low dielectric constant materials may have the same shape or different shapes. The low dielectric constant material 151*a* is placed so that its surface to the +Z-axis direction is in contact with the substrate's surface 205, for example. The low dielectric constant material 151*b* is placed so that its surface to the +Z-axis direction is in contact with the surface of the low dielectric constant material 151*a* to the −Z-axis direction. The combined thickness of the low dielectric constant material 151*a* and the low dielectric constant material 151*b* is approximately equal to the thickness of, for example, the generic substrate 103.

The antenna device 155 may include a plurality of portions having the first thickness like the antenna device 140 (see FIG. 12). In this case, it may include a plurality of low dielectric constant materials for each region having the first thickness in such a manner that they are in contact with the region.

When the antenna device includes a plurality of low dielectric constant materials, as in the case where only a single dielectric is used, they may be placed so that the substrate and low dielectric constant material can be in contact with each other or the low dielectric constant materials can be in contact with each other or, for example, fixed in place by bonding it with a material such as an adhesive or prepreg, or bonded adhesively with a material, such as an adhesive or double-sided tape. Alternatively, the low dielectric constant materials may be placed by, for example, fixing them using a jig.

Fourth Embodiment

An antenna device according to the fourth embodiment will now be described with reference to FIGS. 16 and 17.

Figure 16:
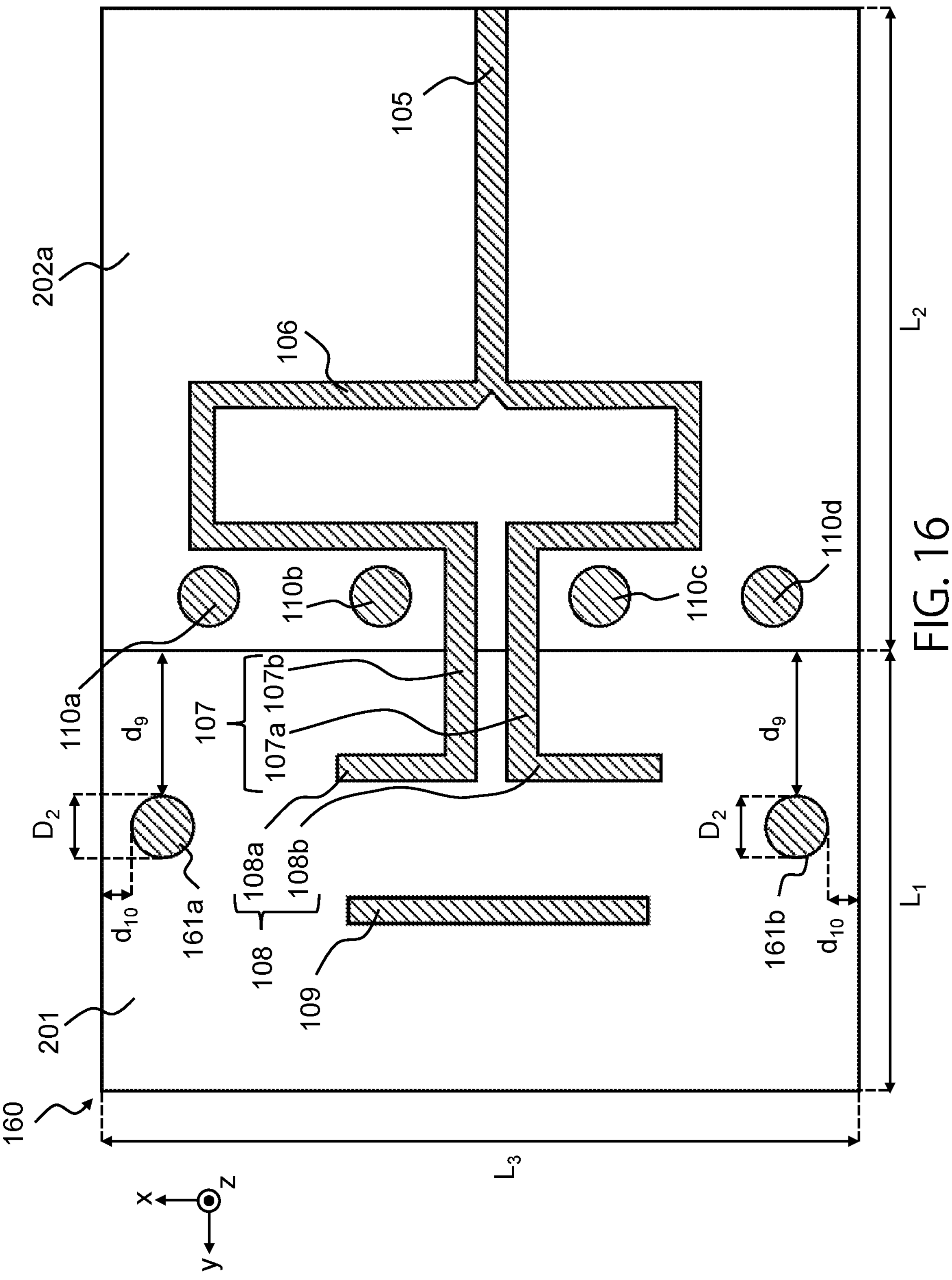
FIG. 16 is a plan view of an antenna device according to a fourth embodiment.
Figure 17:
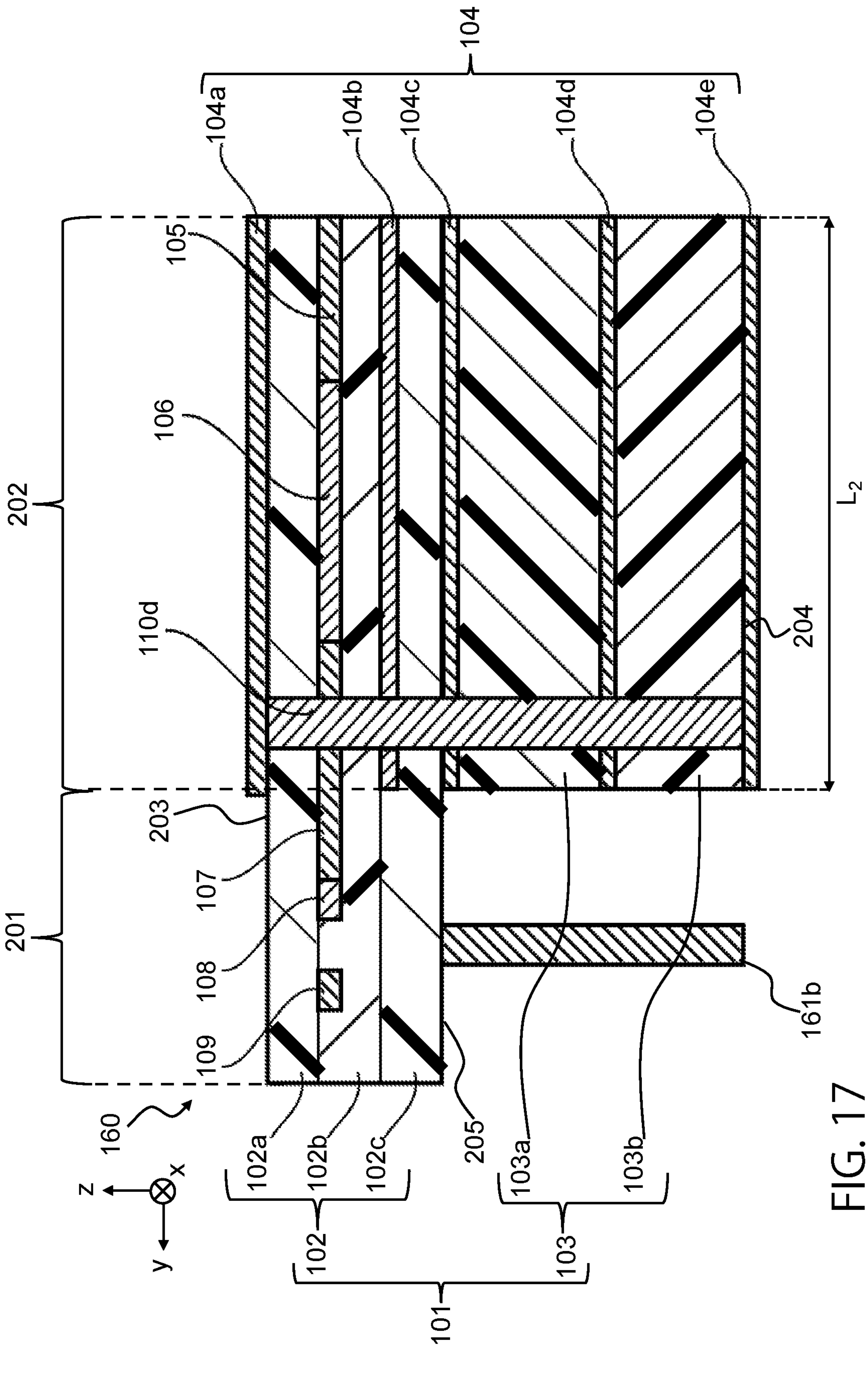
FIG. 17 is a cross-sectional view of the antenna device shown in FIG. 16.

FIG. 16 is a plan view schematically showing an antenna device 160 according to the fourth embodiment. FIG. 17 is a cross-sectional view schematically showing the antenna device 160 shown in FIG. 16. Descriptions of, among the configurations in the fourth embodiment, configurations similar to those in the first embodiment will be omitted or simplified by referring to the description of the first embodiment above.

The antenna device 160 according to the fourth embodiment includes a cylindrical support 161*a* and a cylindrical support 161*b*. The supports 161*a* and 161*b* have circular or generally circular end surfaces parallel to, for example, the XY plane and have a longitudinal direction parallel or generally parallel to the Z-axis. The length of the support 161 in the Z-axis direction is approximately equal to the thickness of the generic substrate 103. The supports 161*a* and 161*b* are placed so that their circular or generally circular end surfaces are in contact with the substrate's surface 205. The supports 161*a* and 161*b* are used to reinforce the first portion 201 to prevent the antenna device 160 from being deformed or broken when, for example, external force is applied to the antenna device 160. The shape of the supports 161*a* and 161*b* may be, for example, a rectangular, hexagonal, or octagonal.

The supports 161*a* and 161*b* may be simply placed in contact with the substrate's surface 205 or, for example, fixed in place by bonding it with an adhesive, or fixed adhesively with an adhesive or double-sided tape. Alternatively, for example, screw holes may be provided in the supports 161*a* and 161*b* and through holes in the first portion 201, and screws are passed through the through holes from the +Z-axis direction so that the supports 161*a* and 161*b* placed in contact with the substrate's surface 205 may be fastened with the screws. This fixes the supports 161*a* and 161*b*.

Examples of the material for the supports 161*a* and 161*b* include insulators, such as resin, rubber, and glass, and metals, such as aluminum, iron, and stainless steel. The shapes and materials of the supports may all be the same or may differ from each other. Although the example shown in FIG. 16 uses two supports, there may be one or three or more supports.

If a support is formed in a portion of the substrate 101 including the feed element 108 and the director 109, as in the antenna device 100*a* according to the comparative example, the difference between the target direction of radiation of the antenna device and the direction of radiation of the antenna device becomes large. Alternatively, the support may cause the electromagnetic waves transmitted or received by the antenna device to diffract and distort the radiation pattern.

For this reason, the supports 161*a* and 161*b* are provided in positions distanced from the feed element 108 and the director 109 when viewed from a direction perpendicular to the surface of the substrate 101. To be specific, the supports 161*a* and 161*b* in the XY plane are provided in positions distanced above and below the feed element 108 and the director 109 (in +X-axis and −X-axis directions). This reduces the risk of a large difference between the target direction of radiation and the radiation direction due to the influence of the supports, or reduces the risk of distortion of the radiation pattern. The supports may be provided in positions distanced in the Y-axis direction. The supports may be provided in positions distanced in at least one of the X-axis and Y-axis directions.

A material with a relative permittivity lower than that of the substrate may be used as the material for the supports. This makes the characteristics of the antenna device 160 less susceptible to the influence of the presence of the supports for the same reason as in the third embodiment. Consequently, even if the supports are provided in positions close to the feed element 108 and the director 109 in the XY plane, the same characteristics of the antenna device as in the third embodiment can be obtained.

Figure 18:
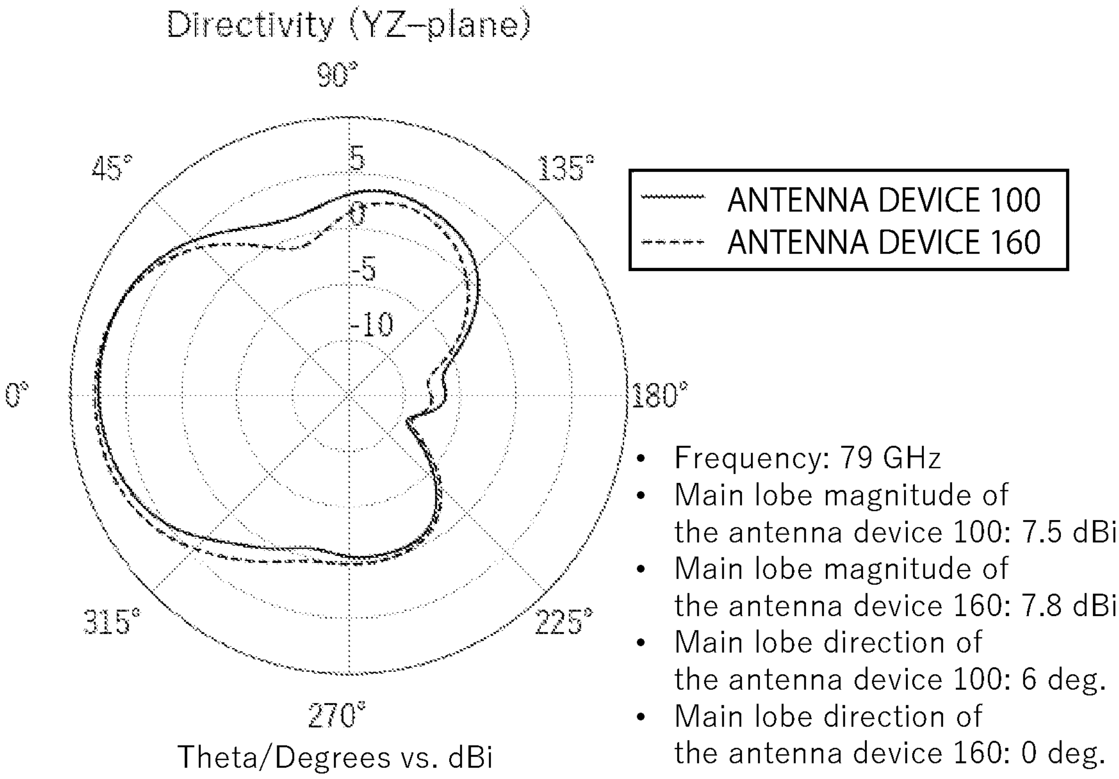
FIG. 18 is a diagram showing electromagnetic field analysis results of radiation directivity on the YZ plane for the antenna device according to the fourth embodiment.

FIG. 18 is a diagram showing an example of electromagnetic field analysis results of directivity of polarized waves on the YZ plane shown in FIG. 16 for the antenna devices 100 and 160. The analysis results were obtained when the material for the supports 161*a* and 161*b* was stainless steel (conductivity is $1.1\times10^{6}$[S/m]). The lengths of the supports 161*a* and 161*b* in the Z-axis direction are approximately equal to the thickness of the generic substrate 103.

In the case of electromagnetic field analysis of directivity in FIG. 18, the dimensions of each component shown in FIG. 16 in millimeters are as follows.

$d_9$: 0.80

$d_{10}$: 0.20

$D_2$: 0.40

The other dimensions are equal to those of the antenna device 100 according to the first embodiment.

The results in FIG. 18 show that the radiation pattern of the antenna device 160 has a maximum value around the target direction of radiation (i.e., +Y-axis direction, 0° in FIG. 18). In the antenna device 160, the difference between the target direction of radiation and the radiation direction is smaller than in the radiation pattern analysis results for the antenna device 100*a* according to the comparative example (results shown in FIG. 6A). Based on the aforementioned electromagnetic field analysis results, the antenna device 160 with the supports 161*a* and 161*b* can also achieve high-gain antenna operation in the target direction of radiation.

Fifth Embodiment

The antenna device according to the fifth embodiment will now be described with reference to FIGS. 19 to 21.

Figure 19:
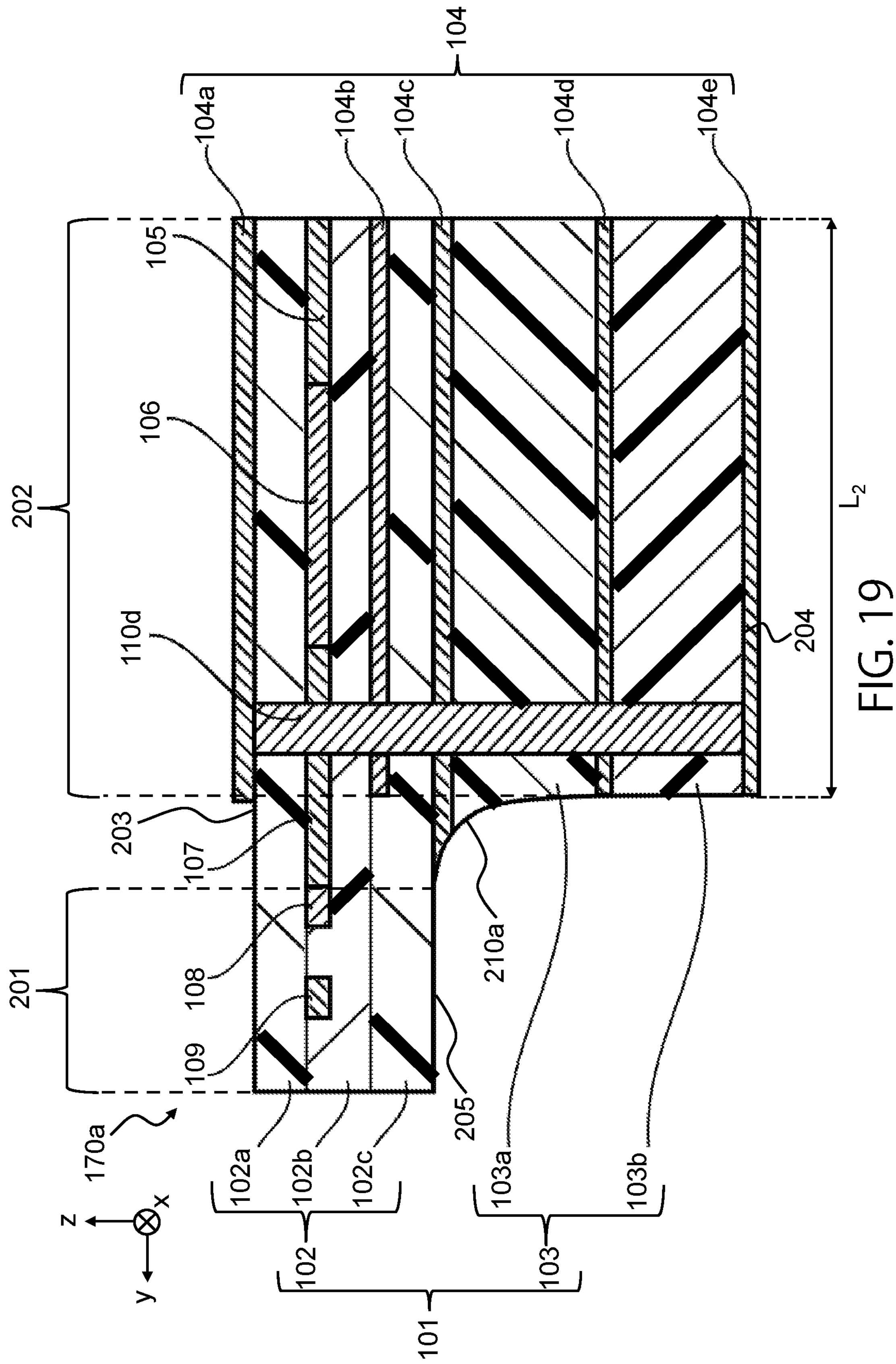
FIG. 19 is a cross-sectional view of a first example of an antenna device according to a fifth embodiment.

FIG. 19 is a cross-sectional view schematically showing an antenna device 170*a* as a first example of an antenna device according to a fifth embodiment.

Figure 20:
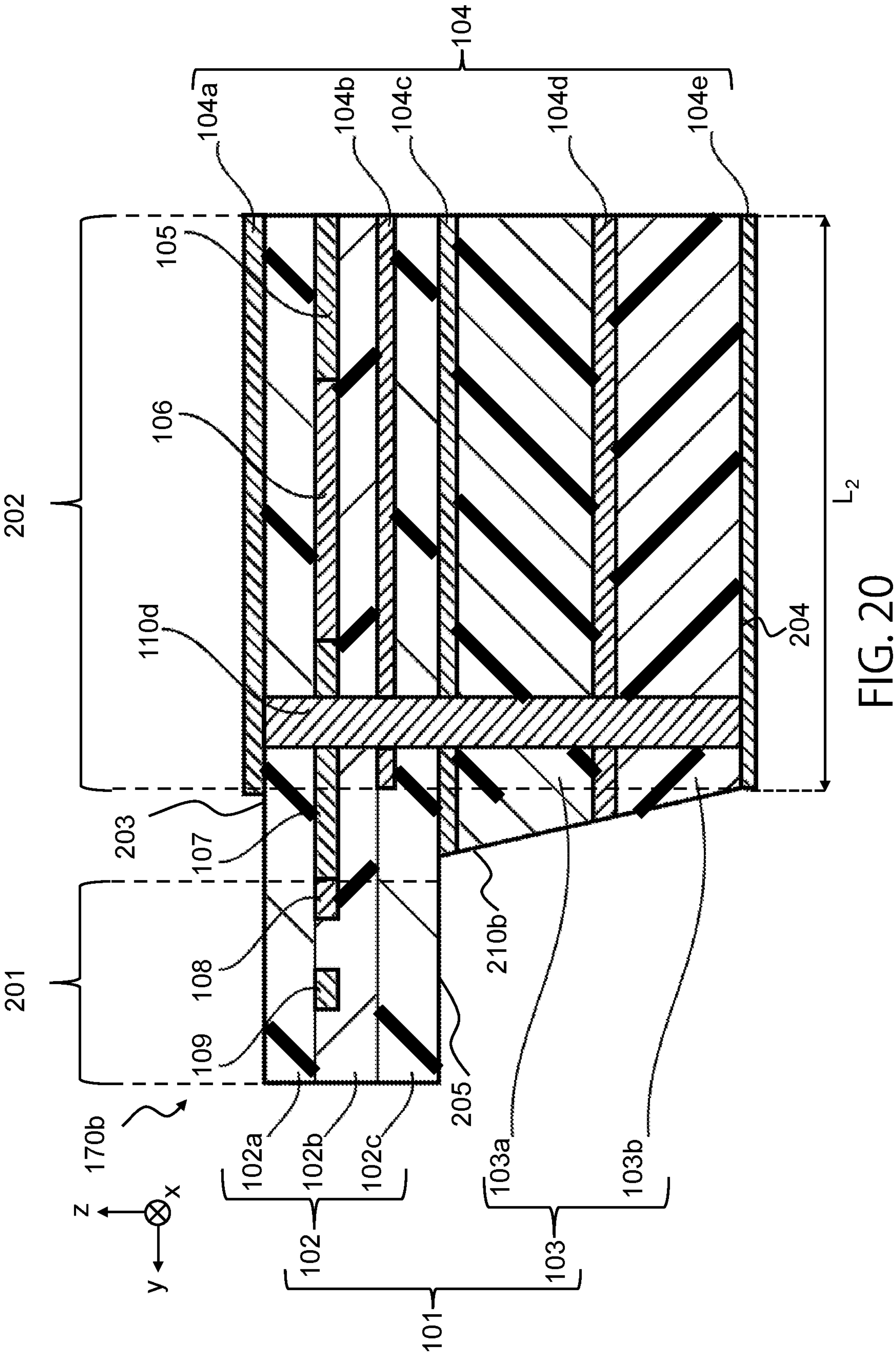
FIG. 20 is a cross-sectional view of a second example of the antenna device according to the fifth embodiment.

FIG. 20 is a cross-sectional view schematically showing an antenna device 170*b* as a second example of the antenna device according to the fifth embodiment.

Figure 21:
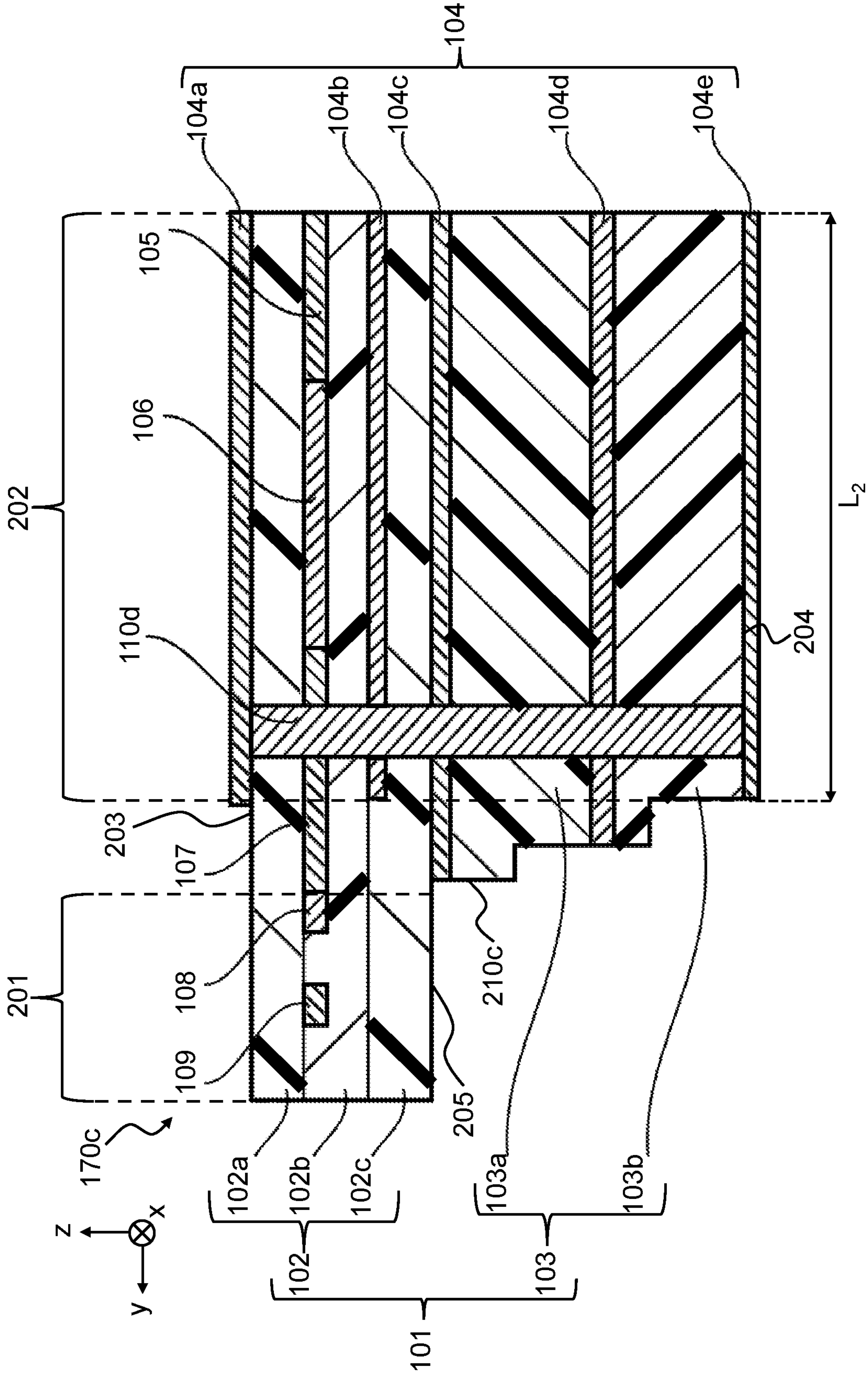
FIG. 21 is a cross-sectional view of a third example of the antenna device according to the fifth embodiment.

FIG. 21 is a cross-sectional view schematically showing an antenna device 170*c* as a third example of the antenna device according to the fifth embodiment.

Descriptions of, among the configurations in the fifth embodiment, configurations similar to those in the first embodiment will be omitted or simplified by referring to the description of the first embodiment above.

In the antenna device 100 according to the first embodiment, the side surfaces of the generic substrate 103 are always parallel or generally parallel to the Z-axis. Therefore, the first portion 201 having the first thickness and the second portion 202 having the second thickness have boundary surfaces that are generally parallel to the Z-axis.

In other words, since the substrate has a generally sheet-like shape, the side surfaces of the substrate are plane surfaces perpendicular or generally perpendicular to the top surface. For this reason, in the case where the antenna device is formed by laminating substrates, the boundary surface between the first portion 201 having the first thickness and the second portion 202 having the second thickness is parallel or generally parallel to the Z-axis.

Here, a generic substrate and a high-frequency substrate that have the same shape may be laminated and the substrates may be processed with a cutting machine, substrate processing machine, router processing machine, or numerical control (NC) machine, thereby forming a portion having the first thickness and a portion having the second thickness in the substrates included in the antenna device.

In this case, for example, the corners of the processed part are usually rounded (so-called corner R) because processing so-called sharp angles (i.e., angular shapes) with a cutting machine takes time. For this reason, as shown in FIG. 19, the boundary surface 210*a* between the first portion 201 and second portion 202 in the antenna device 170*a* is, for example, not parallel or generally parallel to the Z-axis, but has a curvature when viewed from the X-axis direction.

In addition, as in the antenna device 170*b* shown in FIG. 20, depending on the processing method, the boundary surface 210*b* viewed from the X-axis direction may be tilted from the XZ plane. Also, as in the antenna device 170*c* shown in FIG. 21, the boundary surface 210*c* viewed from the X-axis direction may have stair-like steps.

Thus, in the antenna devices 170*a*, 170*b*, and 170*c* shown in FIGS. 19 to 21, the boundary surface between the first portion 201 having the first thickness and the second portion 202 having the second thickness is not parallel or generally parallel to the Z-axis. The thickness of each substrate in the antenna device varies continuously or discretely from the first portion having the first thickness to the second portion having the second thickness. In other words, the thickness of a part of the first portion adjacent to the second portion gradually decreases from the second portion toward the first portion. In such antenna devices 170*a*, 170*b*, and 170*c*, at least a part of the director or at least a part of the feed element in these antenna devices are formed in the first portion 201 having the first thickness, which provides the same advantageous effects as in the antenna device 100.

Similarly, when the antenna device has at least one of a plurality of first portions or a plurality of second portions, the thicknesses of the substrates in the antenna device may vary continuously or discretely from the first portion having the first thickness toward the second portion having the second thickness. In this case also, if at least a part of the director or at least a part of the power feed element in the antenna device is formed in the first portion having the first thickness, the same advantageous effects as in the antenna device 100 are obtained.

Sixth Embodiment

Figure 22:
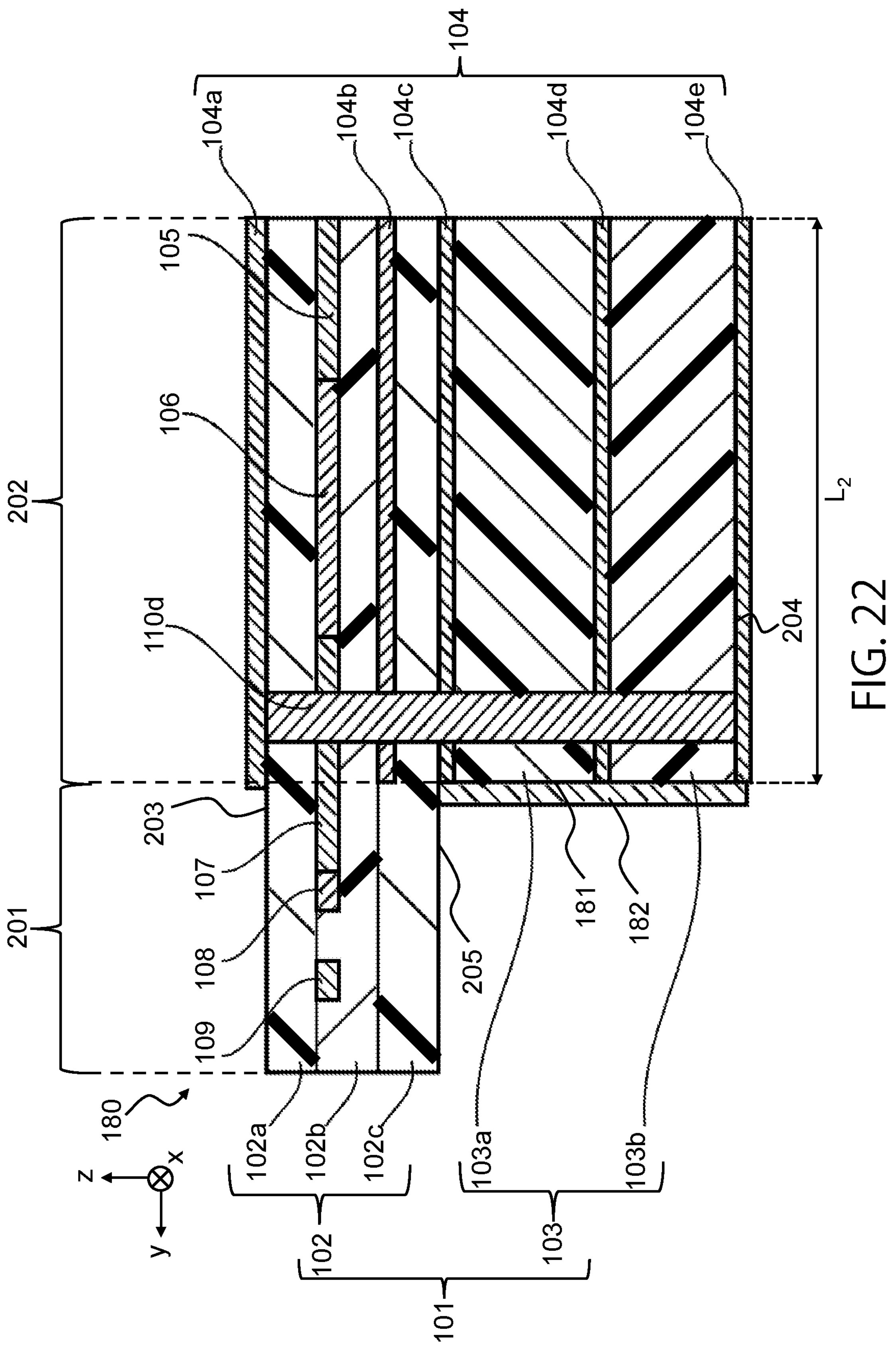
FIG. 22 is a cross-sectional view of an antenna device according to a sixth embodiment.

The antenna device according to the sixth embodiment will now be described with reference to FIG. 22. FIG. 22 is a cross-sectional view schematically showing an antenna device 180 according to the sixth embodiment. Descriptions of, among the configurations in the sixth embodiment, configurations similar to those in the first embodiment will be omitted or simplified by referring to the description of the first embodiment above.

The antenna device 180 has a conductor 182 on, of the boundary surface between the first portion 201 having the first thickness and the second portion 202 having the second thickness, the boundary surface 181 located at the side surface of the generic substrate 103 on the +Y-axis side.

The conductor 182 is a conductor with a surface parallel or generally parallel to the XZ plane, and placed in contact with the boundary surface 181 (the side surface of the generic substrate 103 on the +Y-axis side). The conductor 182 is provided on the side surface (boundary surface 181) of the second portion 202 adjacent to the first portion 201. The length of the conductor 182 in the Z-axis direction is approximately equal to the thickness of the generic substrate 103, and it is placed in contact with the fifth grounding conductor 104*e*. The conductor 182 should not necessarily be in contact with the grounding conductor included in the antenna device 180.

The conductor 182 may be formed, for example, by plating the side surfaces of the substrate 101 included in the antenna device 180 and placing it on the boundary surface 181. Alternatively, the conductor 182 may be formed by, for example, attaching a conductive tape using a conductor, such as an aluminum foil or copper foil, as a base to the boundary surface 181. Alternatively, a thin plate made of a conductor, for example, may be placed in contact with the boundary surface 181.

It is possible that the radio waves transmitted from the antenna device 180 do not only travel in the target direction of radiation of the antenna device 180, but also in a direction from the feed element 108 toward the interior of the antenna device 180 through the boundary surface 181. Alternatively, the radio waves received by the antenna device 180 may travel directly from the direction of arrival of the radio waves or by reflection or diffraction at the antenna device or outside the device, toward the interior of the antenna device 180 through the boundary surface 181.

If radio waves transmitted or received by the antenna device 180 enter the interior of the antenna device 180 from the boundary surface 181, these radio waves may affect the operation of the device. For example, if radio waves transmitted by the antenna device 180 may pass through the boundary surface 181 and excite electronic circuits such as RFICs in the antenna device 180 and cause, for example, interference with signals received by the RFICs, which may interfere with the operation of the antenna device 180.

When the boundary surface 181 is covered by the conductor 182, radio waves transmitted or received by the antenna device 180 and entering the antenna device 180 through the boundary surface 181 are suppressed by the conductor 182. This prevents, for example, radio waves from entering the antenna device 180 through the boundary surface 181 and reduces interference with the electronic circuits and the like in the antenna device 180, thereby improving the operating characteristics of the antenna device.

The conductor 182, which controls radio waves from traveling toward the interior of the antenna device 180, can also function, for example, as a reflector that reflects the radio waves transmitted or received by the antenna device 180.

Seventh Embodiment

A radar device according to the seventh embodiment will now be described with reference to FIGS. 23 and 24.

Figure 23:
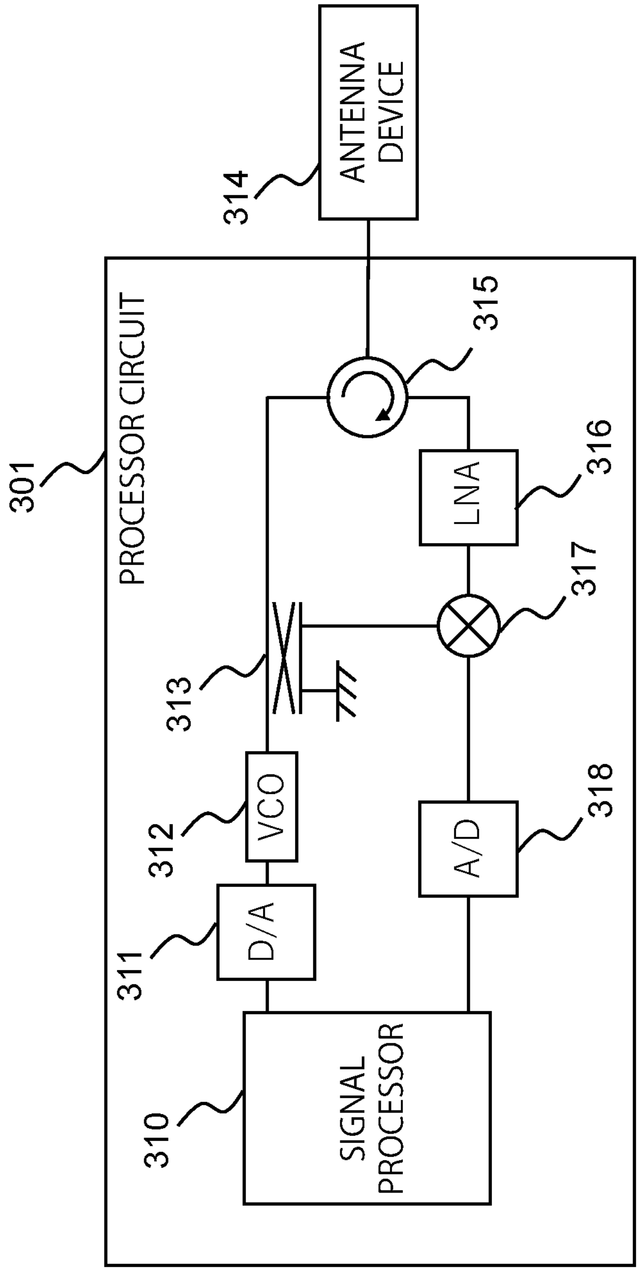
FIG. 23 is a block diagram of a first configuration example of a radar device according to a seventh embodiment.

FIG. 23 is a block diagram showing a first configuration example of the radar device according to the seventh embodiment.

Figure 24:
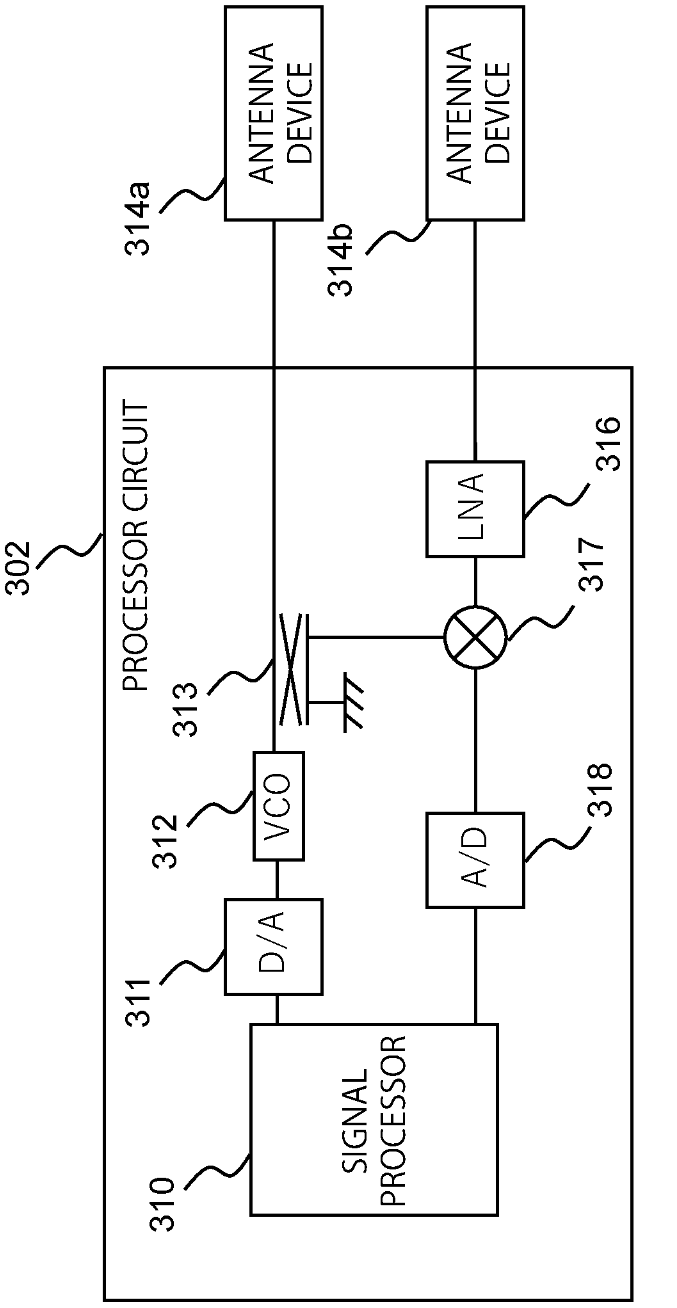
FIG. 24 is a block diagram of a second configuration example of the radar device according to the seventh embodiment.

FIG. 24 is a block diagram showing a second configuration example of the radar device according to the seventh embodiment.

Descriptions of, among the configurations in the seventh embodiment, configurations similar to those in the first embodiment will be omitted or simplified by referring to the description of the first embodiment above.

The radar device in FIG. 23 includes a processor circuit 301 and an antenna device 314. The antenna device 314 is an antenna device according to any of the first to sixth embodiments.

The signal processor 310 in the processor circuit 301 generates control voltage for forming transmission signals by the frequency modulated continuous wave (FMCW) scheme. The D/A converter 311 converts digital voltages generated by the signal processor 310 into analog voltages and give them to the voltage-controlled oscillator (VCO) 312. The VCO 312 generates transmission signals with a continuously varying wavelength. The directional coupler 313 outputs a part of the signal output from the VCO 312, to the circulator 315 and another part of the signal as a local signal to the mixer 317. The circulator 315 outputs the signal input from the directional coupler 313 to the antenna device 314. In the antenna device 314, the input signal is fed to the feed element 108 through, for example, the feeder line 105, and radio waves are radiated from the feed element 108 into space. The reflected waves from the target are received at the feed element 108. A signal based on the received reflected wave is output from the antenna device 314 through, for example, the feeder line 105 and is input to the circulator 315. The circulator 315 outputs the signal input from the antenna device 314 to the low noise amplifier (LNA) 316. The mixer 317 combines the received signal that has been amplified by the LNA 316 and the local signal that has been input to the mixer 317 through the directional coupler 313 to generate a beat signal. The generated beat signal is converted from an analog signal to a digital signal by the A/D converter 318 and is input to the signal processor 310. The signal processor 310 performs signal processing on the input beat signal based on the FMCW algorithm to calculate the relative speed of the target, relative distance, intensity of reflected waves from the target, and the like. The antenna device 314 may be an array antenna including a plurality of antennas (a plurality of feed elements).

In the radar device shown in FIG. 23, signal transmission and signal reception are performed in the same antenna device 314, while in the radar device shown in FIG. 24, the signal transmission and signal reception are performed in different antenna devices. The radar device shown in FIG. 24 includes a processor circuit 302, an antenna device 314*a*, and an antenna device 314*b*. The configuration of the processor circuit 302 is the same as that of the processor circuit 301 shown in FIG. 23, except that it has no circulator. Signal transmission is performed in the antenna device 314*a*, and signal reception is performed in the antenna device 314*b*. The antenna devices 314*a* and 314*b* may be an array antenna including a plurality of antennas.

The antenna devices 314*a* and 314*b* in the radar device in FIG. 24 may all have the same shape and configuration, or they may have different shapes and configurations.

Although this embodiment has described the radar device based on the FMCW scheme, radar devices based on other schemes may also be used as long as they include the antenna device with the configuration described herein.

While certain embodiment have been described, these embodiment have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

Clauses

Clause 1. An antenna device comprising:
- a substrate;
- a feed element provided on or inside the substrate;
- a feeder line provided on or inside the substrate and configured to feed power to the feed element; and
- at least one of a director provided on or inside the substrate and away from the feed element, and a reflector provided on or inside the substrate and away from the feed element, wherein
- the substrate includes a first portion having a first thickness and a second portion having a second thickness greater than the first thickness,
- at least one of at least a part of the feed element and at least a part of the director is provided on or inside the first portion, and
- at least a part of the feeder line is provided on or inside the second portion.

Clause 2. The antenna device according to claim 1, further comprising a grounding conductor on or inside the substrate, wherein
- at least a part of the grounding conductor is provided on or inside the second portion, and
- the reflector is a side surface of the grounding conductor adjacent to the feed element.

Clause 3. The antenna device according to claim 2, wherein a position of the side surface of the grounding conductor coincides with a position of the boundary between the second portion and the first portion.

Clause 4. The antenna device according to any one of claims 1 to 3, wherein the reflector includes at least one conductive pattern provided on a side opposite to a radiation direction of the feed element, and at least a part of the at least one conductive pattern is provided on or inside the first portion.

Clause 5. The antenna device according to any one of claims 1 to 4, wherein the director includes at least one conductive pattern with respect to a radiation direction of the feed element, and at least a part of the at least one conductive pattern is provided on or inside the first portion.

Clause 6. The antenna device according to any one of claims 1 to 5, wherein the substrate has a plurality of the second portions.

Clause 7. The antenna device according to any one of claims 1 to 7, wherein the substrate has a plurality of the first portions.

Clause 8. The antenna device according to any one of claims 1 to 7, further comprising a dielectric layer in contact with the first portion in a first direction perpendicular to a surface of the substrate, wherein
- the dielectric layer has a lower relative permittivity than the substrate.

Clause 9. The antenna device according to claim 8, wherein a sum of the thickness of the first portion and a thickness of the dielectric layer is approximately equal to the thickness of the second portion.

Clause 10. The antenna device according to any one of claims 1 to 9, further comprising at least one support in contact with the first portion in a first direction perpendicular to a surface of the substrate and configured to support the first portion.

Clause 11. The antenna device according to claim 10, wherein the support is located in a position away from the feed element or the reflector when viewed from the first direction.

Clause 12. The antenna device according to claim 11, wherein the support contains a metal.

Clause 13. The antenna device according to any one of claims 10 to 12, wherein the support contains an insulator.

Clause 14. The antenna device according to claim 13, wherein relative permittivity of the support is lower than relative permittivity of the substrate.

Clause 15. The antenna device according to any one of claims 1 to 14, wherein a thickness of a part of the first portion adjacent to the second portion decreases with distance from the second portion.

Clause 16. The antenna device according to any one of claims 1 to 15, further comprising a conductor at least partially covering a side surface of the second portion adjacent to the first portion.

Clause 17. The antenna device according to any one of claims 1 to 16, wherein the substrate includes the first portion and the second portion with respect to a second direction parallel to a surface of the substrate, the substrate is a laminated substrate of a first substrate and a second substrate having a shorter length than the first substrate in the second direction, the second portion is a portion where the first substrate and the second substrate are layered together, and the first portion is a portion of the first substrate where the second substrate is not layered.

Clause 18. The antenna device according to any one of claims 1 to 17, wherein the first substrate is a high-frequency substrate and the second substrate is a generic substrate.

Clause 19. A radar device comprising:

a processor circuit configured to perform at least one of signal transmission processing and signal reception processing; and at least one antenna device configured to perform at least one of transmission and reception of radio waves, wherein the at least one antenna device comprises:

a substrate;

a feed element on or inside the substrate;

a feeder line provided on or inside the substrate and configured to transmit a transmission signal from the processor circuit to the feed element or transmit a reception signal based on radio waves received at the feed element to the processor circuit; and at least one of a director provided on or inside the substrate and away from the feed element, and a reflector provided on or inside the substrate and away from the feed element, the substrate has a first portion having a first thickness and a second portion having a second thickness greater than the first thickness, at least a part of at least one of the feed element and the director is provided on or inside the first portion, and at least a part of the feeder line is provided on or inside the second portion.

Clause 20. The radar device according to claim 19, wherein the at least one antenna device comprises a first antenna device and a second antenna device, the feeder line in the first antenna device is configured to transmit the transmission signal from the processor circuit to the feed element, and the feed element is configured to radiate radio waves based on the transmission signal, and the feeder line in the second antenna device is configured to transmit reception signals based on radio waves received at the feed element to the processor circuit.

The invention claimed is:

1. An antenna device comprising:

a substrate;

a feed element provided on or inside the substrate;

a feeder line provided on or inside the substrate and configured to feed power to the feed element; and at least one of a director provided on or inside the substrate and away from the feed element, and a reflector provided on or inside the substrate and away from the feed element, wherein the substrate includes a first portion having a first thickness and a second portion having a second thickness greater than the first thickness, at least a part of either the feed element or the director is provided on or inside the first portion, and at least a part of the feeder line is provided on or inside the second portion, wherein the substrate includes the first portion and the second portion with respect to a second direction parallel to a surface of the substrate, the substrate is a laminated substrate of a first substrate and a second substrate having a shorter length than the first substrate in the second direction, the second portion is a portion where the first substrate and the second substrate are layered together, and the first portion is a portion of the first substrate where the second substrate is not layered.

2. The antenna device according to claim 1, further comprising a grounding conductor on or inside the substrate, wherein at least a part of the grounding conductor is provided on or inside the second portion, and the reflector is a side surface of the grounding conductor adjacent to the feed element.

3. The antenna device according to claim 2, wherein a position of the side surface of the grounding conductor coincides with a position of the boundary between the second portion and the first portion.

4. The antenna device according to claim 1, wherein the reflector includes at least one conductive pattern provided on a side opposite to a radiation direction of the feed element, and at least a part of the at least one conductive pattern is provided on or inside the first portion.

5. The antenna device according to claim 1, wherein the director includes at least one conductive pattern with respect to a radiation direction of the feed element, and at least a part of the at least one conductive pattern is provided on or inside the first portion.

6. The antenna device according to claim 1, wherein the substrate has a plurality of the second portions.

7. The antenna device according to claim 1, wherein the substrate has a plurality of the first portions.

8. The antenna device according to claim 1, further comprising a dielectric layer in contact with the first portion in a first direction perpendicular to a surface of the substrate, wherein the dielectric layer has a lower relative permittivity than the substrate.

9. The antenna device according to claim 8, wherein a sum of the thickness of the first portion and a thickness of the dielectric layer is approximately equal to the thickness of the second portion.

10. The antenna device according to claim 1, further comprising at least one support in contact with the first portion in a first direction perpendicular to a surface of the substrate and configured to support the first portion.

11. The antenna device according to claim 10, wherein the support is located in a position away from the feed element or the reflector when viewed from the first direction.

12. The antenna device according to claim 11, wherein the support contains a metal.

13. The antenna device according to claim 10, wherein the support contains an insulator.

14. The antenna device according to claim 13, wherein relative permittivity of the support is lower than relative permittivity of the substrate.

15. The antenna device according to claim 1, wherein a thickness of a part of the first portion adjacent to the second portion decreases with distance from the second portion.

16. The antenna device according to claim 1, further comprising a conductor at least partially covering a side surface of the second portion adjacent to the first portion.

17. The antenna device according to claim 1, wherein the first substrate is a high-frequency substrate and the second substrate is a generic substrate.

18. A radar device comprising:

a processor circuit configured to perform at least one of signal transmission processing and signal reception processing; and at least one antenna device configured to perform at least one of transmission and reception of radio waves, wherein the at least one antenna device comprises:

a substrate;

a feed element on or inside the substrate;

a feeder line provided on or inside the substrate and configured to transmit a transmission signal from the processor circuit to the feed element or transmit a reception signal based on radio waves received at the feed element to the processor circuit; and at least one of a director provided on or inside the substrate and away from the feed element, and a reflector provided on or inside the substrate and away from the feed element, the substrate has a first portion having a first thickness and a second portion having a second thickness greater than the first thickness, at least a part of either the feed element or the director is provided on or inside the first portion, and at least a part of the feeder line is provided on or inside the second portion, wherein the substrate includes the first portion and the second portion with respect to a second direction parallel to a surface of the substrate, the substrate is a laminated substrate of a first substrate and a second substrate having a shorter length than the first substrate in the second direction, the second portion is a portion where the first substrate and the second substrate are layered together, and the first portion is a portion of the first substrate where the second substrate is not layered.

19. The radar device according to claim 18, wherein the at least one antenna device comprises a first antenna device and a second antenna device, the feeder line in the first antenna device is configured to transmit the transmission signal from the processor circuit to the feed element, and the feed element is configured to radiate radio waves based on the transmission signal, and the feeder line in the second antenna device is configured to transmit reception signals based on radio waves received at the feed element to the processor circuit.

* * * * *